United States Patent
Murade

(10) Patent No.: US 6,483,493 B2
(45) Date of Patent: *Nov. 19, 2002

(54) ELECTRO-OPTICAL APPARATUS AND ELECTRONIC DEVICE

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/828,965

(22) Filed: Apr. 10, 2001

(65) Prior Publication Data

US 2001/0022572 A1 Sep. 20, 2001

Related U.S. Application Data

(63) Continuation of application No. 09/331,841, filed as application No. PCT/JP98/04822 on Oct. 23, 1998, now Pat. No. 6,262,702.

(30) Foreign Application Priority Data

Oct. 31, 1997 (JP) ............................................. P9-201253
Jan. 9, 1998 (JP) ........................................... P10-015149

(51) Int. Cl.⁷ ................................................. G09G 3/36
(52) U.S. Cl. ............................. 345/87; 345/98; 345/100
(58) Field of Search ........................... 345/87, 98, 100, 345/88, 89, 54, 55, 204, 205, 211

(56) References Cited

U.S. PATENT DOCUMENTS

| 5,745,087 A | 4/1998 | Tomiyoshi et al. ............ 345/87 |
| 5,748,164 A | 5/1998 | Handschy et al. ............. 345/87 |
| 6,160,535 A | 12/2000 | Park ............................. 345/98 |
| 6,169,532 B1 | 1/2001 | Sumi et al. .................... 345/98 |

FOREIGN PATENT DOCUMENTS

| JP | A-1-281423 | 11/1989 |
| JP | A-6-11684 | 1/1994 |
| JP | A-6-37478 | 2/1994 |
| JP | A-9-258251 | 10/1997 |

*Primary Examiner*—Richard Hjerpe
*Assistant Examiner*—Ronald Laneau
(74) *Attorney, Agent, or Firm*—Oliff & Berridge, PLC

(57) ABSTRACT

In an active-matrix driving type electro-optical apparatus including an increased number of image signal lines corresponding to an increased number of phases obtained by serial-to-parallel conversion, a liquid crystal apparatus includes a liquid crystal layer disposed between two substrates, pixel electrodes formed in a matrix fashion on a substrate, and TFTs serving for switching and controlling the pixel electrodes for suppressing the intrusion of high-frequency clock noise into an image signal. Image signal lines extend on the substrate at both sides of a data line driving circuit. The image signal lines are electrically shielded from clock signal lines, for example, by shielding lines formed on the substrate, and maintained at a constant voltage.

13 Claims, 20 Drawing Sheets

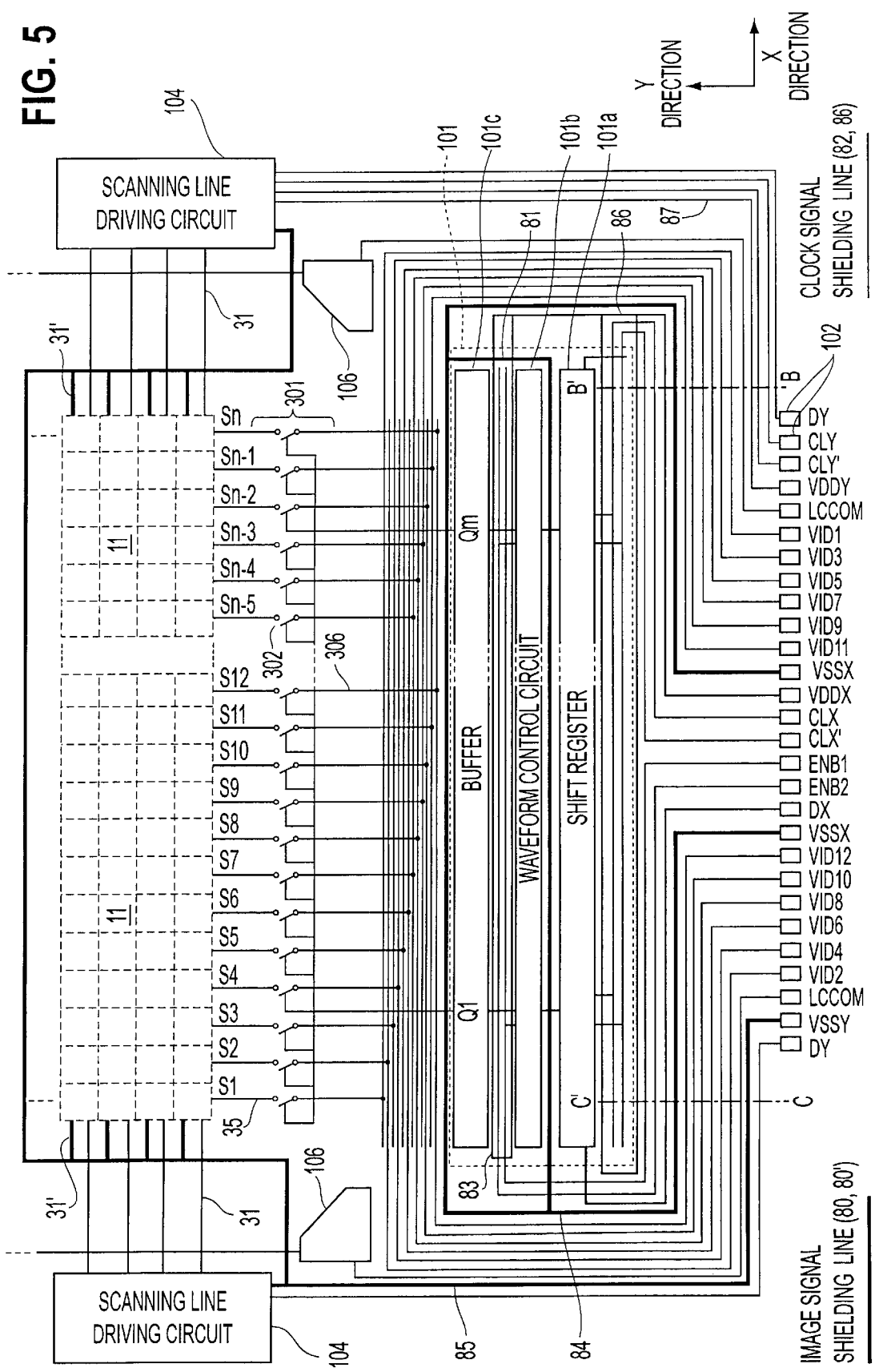

ELECTRO-OPTICAL APPARATUS AND ELECTRONIC DEVICE

This application is a continuation of Ser. No. 09/331,841 filed Jun. 28,1999 U.S. Pat. No. 6,262,702 which is a 371 of PCT/JP98/04822 filed Oct. 23, 1998.

BACKGROUND OF THE INVENTION

1. Field of the Invention The present invention relates to a technical field of an electro-optical apparatus such as an active matrix driving liquid crystal apparatus driven by thin film transistors (hereinafter also referred to as TFTs) or the like, and also to an electronic device using the same. More particularly, the present invention relates to an electro-optical apparatus in which data lines are driven at a high frequency by a data line driving circuit provided on a TFT array substrate in response to a control signal such as a clock signal, and also an electronic device using the same.

2. Description of Related Art

In conventional electro-optical apparatuses such as an active-matrix driving TFT liquid crystal apparatus, a great number of scanning lines and data lines are formed in horizontal and vertical directions, respectively, on a TFT array substrate, and a great number of pixel electrodes are formed at respective intersections of the scanning lines and the data lines. In some cases, in addition to the above elements, other elements are also formed on the TFT array substrate, such as data signal supply means including a data line driving circuit and a sampling circuit or the like and serving to supply a data signal to the data lines, and also a scanning signal supply means including a scanning line driving circuit or the like and serving to supply a scanning signal to the scanning lines.

In this case, a control signal such as a data line side reference clock signal which activates a data line driving circuit indicating a time reference for supplying a data signal, an image signal which corresponds to the content of images to be displayed and which is used as a basis on which the data signal is produced, and positive and negative constant electric potential power-supply or the like are supplied to the data signal supply means via external input terminals and wiring provided on the TFT array substrate, respectively. Similarly, a scanning line side reference clock signal which activates a scanning line driving circuit indicating a time reference for supplying a scanning signal, and positive and negative constant electric potential power-supply are supplied to the scanning signal supply means via external input terminals and wiring provided on the TFT array substrate. In the scanning signal supply means, for example, the scanning line driving circuit supplies a scanning signal over the scanning lines on the line-by-line basis in accordance with the scanning line side reference clock signal In response, in the data signal supply means, the data line driving circuit drives the sampling circuits, which serve to sample the input image signal, one by one in accordance with the timing indicated by the data line side reference clock signal. As a result, a data signal is supplied from the sampling circuits over the data lines. The respective TFTs whose gate is connected to one of the scanning lines turn on in response to receipt of the scanning signal supplied via the scanning lines. As a result, the data signal is supplied to the pixel electrodes via the corresponding TFTs and thus an image is displayed on the respective pixels.

In recent liquid crystal apparatuses, in particular in those for use in a liquid crystal projector, the frequency of serial image signals becomes increasingly high with the increase in the resolution of the image displayed. For example, the dot frequency of the image signal in the XGA display mode or SXGA display mode employed in recent high-resolution displays for personal computers is about 65 MHZ and 135 MHZ, respectively, which are much higher than the dot frequency in the conventional VGA mode (about 30 MHZ). As a result, a very high frequency is also required for the data line side reference clock signal supplied to the data signal supply means.

SUMMARY OF THE INVENTION

The increase in the frequency of the reference clock signals results in generation of high-frequency clock noise, which cannot be neglected, to achieve a high-quality display image. With the conventional technique of supplying a relatively low-frequency data line side reference clock signal to the data line driving circuit to drive the sampling circuit, if the frequency of the clock signal is simply increased, high-frequency clock noise intrudes into the image signal input to the sampling circuit or into the data signal output from the sampling circuit, and thus the data signal supplied to the data lines is degraded by the noise. The degradation in the data signal input to the respective pixels results in degradation in the image displayed by the respective pixels. For example, when a halftone image is displayed by the respective pixels, if noise as small as about 10 mV intrudes into the image signal, then visual noise appears in the displayed image. This is because, in the case of the halftone image, unlike the two-level display in which only white and black levels are displayed by applying a highest or lowest driving voltage (for example, 5 and 0 V) to a liquid crystal, the transmittance of the liquid crystal is very sensitive to the change in the voltage applied to the liquid crystal. Therefore, high-frequency clock noise is an important problem which has to be solved to realize a high-precision multi-level gray scale display.

If the number of phases into which the original image signal is serial-to-parallel converted is increased, it is possible to reduce the frequency of the image signals supplied to the sampling circuit. However, in this case, it is required to increase the number of external input terminals, which are provided on a substrate of a liquid crystal apparatus so as to input an image signal, depending on the number of phases of the serial-to-parallel-converted image signal. For example, when the serial-to-parallel conversion is performed into six phases, six external input terminals for inputting the image signal are required. In the case where the serial-to-parallel conversion is performed into twelve phases, twelve external input terminals are required. Furthermore, it is also required that there be as many wirings for transferring the image signal, input via the external input terminals, to the sampling circuit as there are serial-to-parallel conversion phases. As a result, the wirings for the image signal occupy a large area on the substrate of the liquid crystal apparatus. This makes it difficult to allocate a proper area on the substrate for forming the data signal supply means including the sampling circuit, the data line driving circuit, or the like. If wirings for control signals such as a clock signal are formed on a substrate in such a manner that they extend from an edge of the substrate where external input terminals are formed to one side of the data line driving circuit, and many wirings for image signals are formed on a substrate in such a manner that they extend to the other side if the data line driving circuit as is employed in the conventional technique, then the number of wirings extended to each side becomes very different between two sides of the data line driving circuit, so that the wiring balance in the surrounding of the data line driving circuit becomes quite bad (that is, wirings are concentrated on only one side). It is possible to increase the size of the substrate of the liquid crystal apparatus so that the wiring area and the data line driving circuit are disposed in the increased area. However, the increase in the size does not meet the requirement in the art of the liquid crystal apparatus for achievement of a large image display area using a limited size of substrate.

In view of the above, it is an object of the present invention to provide an electronic device including an electro-optical apparatus capable of displaying a high-quality image according to an input image signal or a data signal generated from the image signal with suppressed high-frequency clock noise.

It is another object of the present invention to provide a liquid crystal apparatus capable of displaying a high-quality image and also an electronic device provided with such a liquid crystal apparatus, in which a great number of wirings and a great number of external input terminals corresponding to a great number of serial-to-parallel-converted phases of an image signal are disposed in a well-balanced fashion and negative effects of high-frequency clock noise arising from control signals, such as a high-frequency clock signals, on the image signal are suppressed.

According to a first aspect of the present invention, to achieve the above objects, there is provided an electro-optical apparatus comprising a substrate and elements formed on the substrate, the elements including: a plurality of scanning lines; a plurality of data lines intersecting the plurality of scanning lines; a plurality of switching elements connected to the plurality of scanning lines and data lines; a plurality of pixel electrodes connected to the plurality of switching elements; data signal supply means for supplying, in response to a clock signal, a data signal corresponding to an image signal to the plurality of data lines; an image signal line for supplying the image signal input via a first external input terminal to the data signal supply means; a clock signal line for supplying the clock signal input via a second external input terminal to the data signal supply means; and an electrically conductive line maintained at a constant electric potential for shielding the image signal line from the clock signal line.

In accordance with these features of the invention, the image signal is input via the first external input terminal and supplied to the data signal supply means via the image signal line extending on the substrate. In parallel to the image signal, the clock signal is input via the second external input terminal and supplied to the data signal supply means via the clock signal line extending on the substrate. In response to this clock signal, the data signal supply means including, for example, a data line driving circuit and a sampling circuit or the like provided on a first substrate supplies the data signal corresponding to the image signal on the basis of the clock signal to the plurality of data lines. Herein, the image signal line is electrically shielded from the clock signal line by means of the electrically conductive line extending on the substrate and maintained at the constant electric potential, so that intrusion of high-frequency clock noise from the clock signal line to the image signal line is suppressed even when the clock signal has a high frequency.

On the other hand, a scanning signal is supplied to the switching elements via scanning lines by scanning signal supply means including a scanning line driving circuit formed on or connected to the substrate. Data signals corresponding to the image signals, whose clock noise is suppressed in the above-described manner, are supplied to respective switching elements via corresponding data lines. The voltages applied to the respective pixel electrodes by the data signals supplied via the switching elements vary in accordance with the applied data signals, and liquid crystals corresponding to the respective pixel electrodes are driven by the applied voltage. As a result, a high-quality image with a high resolution is displayed in accordance with the serial high-frequency image signal under the control of the high-frequency clock signal without having any or significant degradation in the image quality caused by high-frequency clock noise.

In this first aspect of the invention, the electrically conductive line preferably includes a part made up of a constant electric potential line for supplying a constant electric potential power-supply to the data signal supply means.

In accordance with these features of the invention, because the electrically conductive line includes the part made up of the constant electric potential line for supplying the constant electric potential power-supply to the data signal supplying means, it is possible to share an external input terminal and a wiring itself . In other words, it is possible to realize the electrically conductive line by extending the constant electric potential line. Thus it is possible to achieve simplification in structure and a reduction in space. Furthermore, it becomes very easy to maintain the electrically conductive line at a constant electric potential.

In another preferred mode of the first aspect of the present invention, the constant electric potential line includes first and second constant electric potential lines for supplying different constant electric potential power-supply to the data signal supply means, the part of the electrically conductive line formed of the first constant electric potential line surrounds the image signal line on the first substrate, and the part of the electrically conductive line formed of the second constant electric potential line surrounds the clock signal line on the substrate.

In accordance with these features of the first aspect of the invention, on the substrate, the image signal line is surrounded, for example, by the part of the electrically conductive line made up of the first constant electric potential line for supplying a negative power supply equal to a ground electric potential. On the other hand, on the substrate, the clock signal line is surrounded, for example, by the part of the electrically conductive line made up of the second constant electric potential line for supplying a positive power-supply. Thus, on the first substrate, the image signal line is doubly shielded, from the clock signal lines.

In still another preferred mode according to the first aspect of the invention, the data signal supply means includes a sampling circuit for sampling the image signal, and also includes a data line driving circuit which receives electric power supplied via the constant electric potential line and which drives the sampling circuit in accordance with the clock signal, and the image signal line and the clock signal line extend on the substrate in directions opposite to each other with respect to the data line driving circuit.

In accordance with these features of the invention, the image signal is sampled by the sampling circuit in the scanning signal supply means. In accordance with the clock signal, the sampling circuit is driven by the data line driving circuit which receives electric power via the constant electric potential line. The resultant sampled image signal is supplied as a data signal over the data lines. In this preferred mode, as described above, the image signal line and the clock signal line are formed such that they extend on the substrate in directions opposite to each other with respect to the data line driving circuit. In general, electromagnetic waves decay with distance, depending on the presence of an obstacle. Thus, electromagnetic waves applied to the image signal line from the clock signal line decrease depending on the distance between the image signal line and the clock signal line, and also depending on the presence of the data line driving circuit. Therefore, even when the clock signal has a high frequency, intrusion of high-frequency clock noise from the clock signal line to the image signal line is suppressed.

In a further preferred mode according to the first aspect of the present invention, the first and second external input terminals are disposed in a peripheral area of the substrate such that they are spaced from each other by a predetermined distance and a third external input terminal for inputting the constant electric potential power-supply to the constant electric potential line is disposed between the first and second external input terminals.

That is, in accordance with these features of the present invention, the first and second external input terminals are disposed in the peripheral area of the substrate such that they are spaced from each other by the predetermined distance via the third external input terminal, and more preferably, they are spaced as far apart as possible from each other within the area available for formation of the external input terminals on the periphery of the substrate. As a result of the above arrangement, the image signal line encounters less intrusion of high-frequency clock noise from the clock signal line compared with the case where the image signal line and the clock signal line are disposed close to each other.

In a yet further preferred mode according to the first aspect of the present invention, on the substrate, the electrically conductive line is extended such that the electrically conductive line surrounds an image display area defined by the plurality of pixel electrodes, and also surrounds the plurality of data lines.

That is, in accordance with these features of the present invention, because the image display area and the plurality of data lines are surrounded by the electrically conductive line on the substrate, the image display area and the plurality of data lines are shielded from the clock signal line. Thus, intrusion of high-frequency clock noise into the data signal output from the data signal supply means and to the data signal input to the switching elements or the pixel electrodes is suppressed.

In a different preferred mode according to the first aspect of the present invention, an electro-optical material is disposed between the substrate and an opposite substrate, and a light shielding frame is disposed on at least either the substrate or the opposite substrate, and furthermore the electrically conductive line includes a part formed on the substrate at a location opposite to the light shielding frame and along the light shielding frame.

That is, in accordance with these features of the present invention, because the electrically conductive line is disposed under the light shielding frame formed on the opposite substrate, the required space on the TFT array substrate is reduced. More specifically, it is possible to find a sufficient area on the periphery of the substrate for forming the scanning line driving circuit and the data line driving circuit without having a reduction in the effective image display area of the electro-optical apparatus caused by formation of the electrically conductive line.

In a different preferred mode according to the first aspect of the present invention, the electrically conductive line and the data line are formed of the same metal material with a low resistance.

In accordance with these features of the present invention, because the electrically conductive line is formed of the same metal material with a low resistance as that used to form the data lines, such as Al (aluminum), the electrically conductive line may extend along a long distance while maintaining the resistance of the electrically conductive line to a level low enough for practical use. That is, it becomes possible to extend the electrically conductive line in a zigzag fashion between other wirings or various circuits along a long distance or over a wide area including the image display area, without encountering a reduction in the shielding effects caused by the increase in resistance. Thus, it is possible to enhance the overall shielding effects using a rather simple structure. Furthermore, it is possible to form the electrically conductive line and the data lines using the same metal material with a low resistance in the same process during the production process of the electro-optical apparatus. That is, the increase in the processing steps resulting from the introduction of the electrically conductive line can be minimized.

In a different preferred mode according to the first aspect of the present invention, the part of the electrically conductive line formed between the image signal line and the clock signal line, the image signal line, and the clock signal line are formed from the same low-resistance metal layer formed in a single same plane parallel to the substrate.

In accordance with these features of the present invention, because the part of the electrically conductive line formed between the image signal line and the clock signal line, the image signal line, and the clock signal line are formed in the single same plane parallel to the substrate, it is possible to achieve further improved shielding effects. Herein, the "formation in the same plane" includes the case where the above lines are formed directly on the substrate and also the case where the above-described lines are formed on an insulating layer formed on the substrate or the case where the above-described lines are formed on an interlayer insulating layer formed on a semiconductor layer in which TFTs and switching elements or the like are formed. Furthermore, because the electrically conductive line, the image signal line, and the clock signal line are formed from the same low-resistance metal layer, such as an Al layer, at the same time during the process of producing the electro-optical apparatus, the increase in the production processing steps caused by the introduction of the electrically conductive line is minimized.

In a preferred mode according to the first aspect of the present invention, there is provided a capacitance line for adding a predetermined magnitude of capacitance to the pixel electrode, wherein the capacitance line is connected to the electrically conductive line.

In accordance with these features of the present invention, because the predetermined magnitude of capacitance is added by the capacitance line to the pixel electrode, it becomes possible to display a high-precision image even when the duty ratio is small. Furthermore, because the capacitance line is connected to the electrically conductive line, it is possible to prevent negative effects of the variation in electric potential of the capacitance line on the switching elements and pixel electrodes. Furthermore, the electrically conductive line can also serve as a wiring for maintaining the capacitance line at a constant electric potential. Still furthermore, for example, the third external input terminal or the external input terminal for the electrically conductive line may be employed also as an external input terminal for inputting the constant electric potential at which the capacitance line is maintained.

According to a second aspect of the present invention, there is provided an electro-optical apparatus comprising a substrate and elements formed on the substrate, the elements including: a plurality of data lines; a plurality of scanning lines crossing the plurality of data lines; a plurality of switching elements connected to the plurality of data lines and the plurality of scanning lines; a plurality of pixel electrodes connected to the plurality of switching elements; a plurality of image signal lines supplied with image signals; a plurality of control signal lines supplied with control signals including a clock signal; and data signal supply means which receives the image signals and the control signals via the image signal lines and the control signal lines, and which supplies data signals corresponding to the image signals to the plurality of data lines in accordance with the control signals; wherein, on the substrate, a first group of image signal lines of the plurality of image signal lines extend to one side of the data signal supply means and a second group of image signal lines of the plurality of image signal lines extend, to the opposite side of the data signal supply means, and the electro-optical apparatus further comprises at least one electrically conductive line which is formed on the substrate so as to electrically shield the first and second groups of image signal lines from the plurality of control signal lines.

In this second aspect of the present invention, the image signals are input to the data signal supplying means via the image signal lines. In parallel with the image signals, the control signals including a clock signal and an enable signal or the like are supplied to the data signal supply means via the control signal lines. In response, the data signal supplying means including a data line driving circuit and a sampling circuit, for example, supplies the data signals corresponding to the image signals to the plurality of data lines on the basis of the control signals. The image signal lines are electrically shielded by the electrically conductive line formed on the substrate from the respective control signal lines including the clock signal line and the enable signal line or the like. Therefore, even when the clock signal has a high frequency, intrusion of high-frequency clock noise from the control lines such as a clock signal line to the image signal lines is suppressed.

On the other hand, a scanning signal is supplied to the switching elements via scanning lines from scanning signal supply means, including a scanning line driving circuit formed on or connected to the substrate. In parallel with this, data signals corresponding to the image signals, whose clock noise is suppressed in the above-described manner, are supplied to the respective switching elements via corresponding data lines. Thus, the voltages applied to the pixel electrodes vary in accordance with the data signals supplied via the switching elements and liquid crystals corresponding to the respective pixel electrodes are driven by the applied voltage.

Therefore, even when it is required to display a high-resolution image in accordance with image signals converted from a serial form into a parallel form consisting of a plurality of phases, it is possible to display the image with high quality without having any or significant degradation in the image quality caused by high-frequency clock noise. Furthermore, on the substrate, the first group of image signal lines extend to one side of the data signal supply means while the second group of image signal lines extend to the opposite side of the data signal supply means. Thus, it is possible to reduce the frequency of the image signals supplied to the data signal supply means by increasing the number of phases into which the original image signal is serial-to-parallel converted, for example, to 12 or 24 phases. The great number of image signal lines corresponding to the increased number of phases are disposed at both sides of the data signal supply means such that they are distributed in a well-balanced fashion. This makes it possible to easily find an area on the substrate for use as an area in which the sampling circuit or the data signal supply means including the sampling circuit and the data line driving circuit or the like is formed. Thus it becomes possible to form a large image display area on a substrate with a limited size.

In a preferred mode according to the second aspect of the present invention, the electrically conductive line shields the first and second groups of image signal lines from at least a high-frequency control signal line of the plurality of control signal lines, the high-frequency control signal line having a repetition period shorter than the horizontal scanning period of the image signals.

That is, in accordance with these features of the present invention, the image signal lines are electrically shielded from the high-frequency control signal line for supplying a high-frequency control signal (such as a clock signal and an enable signal) of the plurality of control signal lines by the electrically conductive line . Therefore, even when the clock signal has a high frequency, intrusion of high-frequency clock noise from the high-frequency control signal line to the image signal lines is suppressed. On the other hand, a low-frequency control signal (such as a start signal for a shift register in the data line driving circuit) does not cause high-frequency noise to the image signals or the data signals. Therefore, the low-frequency control signal line for supplying such a control signal may or may not be shielded by an electrically conductive line.

In another preferred mode according to the second aspect of the present invention, of the plurality of control signal lines, a low-frequency control signal line for supplying a low-frequency control signal having a repetition period which is, at least, not shorter than the horizontal scanning period of the image signals is disposed together with the electrically conductive line between the first and second groups of image signal lines and the high-frequency control signal line.

In accordance with these features of the present invention, of the image signal lines included in the first or second image signal line groups, an image signal line closest to the high-frequency control signal line is physically spaced apart and electrically shielded from the high-frequency control signal line by at least two wirings, including the low-frequency control signal line and the electrically conductive line. That is, the low-frequency control signal line for supplying a low-frequency control signal (such as a start signal for the shift register in the data line driving circuit) which does not cause high-frequency noise to the image signals or the data signals is disposed together with the electrically conductive line between the high-frequency control signal line and the image signal lines, thereby further reducing the negative effects, such as clock noise, of the high-frequency control signal line on the image signal lines. In general, electromagnetic waves decay with distance, depending on the presence of an obstacle. Thus, electromagnetic waves applied to the image signal lines from the high-frequency control signal line can be reduced by disposing as many electrically conductive lines and low-frequency control signal lines between the control signal lines and the image signal lines. Disposing a low-frequency control signal line, in addition to an electrically conductive line, between the high-frequency control signal line and the image signal lines results in efficient use of the space on the substrate and also a reduction in noise.

In still another preferred mode according to the second aspect of the present invention, the electro-optical device further comprises external input terminals formed in a peripheral area of the substrate, the external input terminals including: a plurality of first external input terminals connected to the first group of image signal lines, the plurality of first external input terminals serving to receive the respective image signal from an external image signal source; a plurality of second external input terminals connected to the second group of image signal lines, the plurality of second external input terminals serving to receive the respective image signal from the external image signal source; a plurality of third external input terminals connected to the control signal lines, the plurality of third external input terminals serving to receive the control signals from an external control signal source; and a plurality of fourth external input terminals connected to the electrically conductive lines, wherein the third external input terminals are disposed between the first and second external input terminals, and the fourth external input terminals are disposed between the first and third external input terminals and between the third and second external input terminals.

In accordance with these features of the present invention, as described above, the plurality of third external input terminals connected to the control signal lines are disposed on the periphery of the substrate such that they are located between the plurality of first and second external input terminals connected to the first and second groups of image signal lines, respectively. That is, in the peripheral area of the substrate where the first to fourth external input terminals are formed, the plurality of third external input terminals connected to the control signal lines are disposed in a central area in a concentrated fashion, and the first and second external input terminals connected to the first and second groups of image signal lines, respectively, are disposed at both sides of the third external input terminals. The fourth external input terminals connected to the electrically conductive lines are disposed between the first and third external input terminals and between the third and second external input terminals. That is, the first and second groups of image signal lines are spaced, on the substrate, apart from the control signal lines, and the electrically conductive lines are disposed in this space. This arrangement makes it possible to effectively prevent the image signals from encountering noise arising from the control signals such as a clock signal before the image signals are input to the electro-optical apparatus. Instead of employing the above arrangement according to the present invention, if the plurality of external input terminals connected to the image signal lines and those connected to the control signal lines are disposed in a mixed fashion in the same area or disposed at locations close to each other, then the image signals and the control signals are input to the electro-optical apparatus along wirings adjacent or close to each other, and thus noise such as clock noise intrudes into the image signals. However, in the present invention, intrusion of high-frequency clock noise from the clock signal line to the image signal lines is suppressed before and after the image signals are input to the electro-optical apparatus. More preferably, the first and second external input terminals are disposed at locations shifted to both side ends to as large a degree as possible in areas available for formation of the external input terminals on the periphery of substrate, and the first and second external input terminals are spaced as far apart as possible from the third external input terminals disposed between them, so that the fourth external input terminals connected to the electrically conductive lines are disposed in the spaces.

In a further preferred mode according to the second aspect of the present invention, the electrically conductive line shields the first and second groups of image signal lines from a high-frequency control signal line of the plurality of control signal lines, for supplying the high-frequency control signal having a repetition period which is, at least, shorter than the horizontal scanning period of the image signals, wherein, of the third external input terminals, the one adjacent to the fourth external input terminals is connected to a low-frequency control signal line of the plurality of control signal lines for supplying a low-frequency control signal having a repetition period which is, at least, not shorter than the horizontal scanning period of the image signals.

In accordance with these features of the present invention, the image signal lines are electrically shielded by the electrically conductive lines from the high-frequency control signal line. In particular, of the third external input terminals connected to the control signal lines, the third external input terminal located adjacent the fourth external input terminals connected to the electrically conductive lines is connected to the low-frequency control signal line. As a result, the image signal lines are physically spaced apart and electrically shielded from the high-frequency control signal line by at least two wirings including the low-frequency control signal line and the electrically conductive line.

In a yet further preferred mode according to the second aspect of the present invention, the electrically conductive line includes a part made up of a data line which drives a constant electric potintial lilne for supplying a power-supply which drives data lines of a constant electric potential to the data signal supplying means.

In accordance with these features of the present invention, because the electrically conductive line includes the part made up of the data line which drives a constant electric potential line for supplying a power supply which drives data lines of a constant electric potential to the data signal supplying means, it is possible to share an external input terminal and a wiring independent of the electrically conductive line and the constant electric potential line. In other words, it is possible to realize the electrically conductive line by extending the constant electric potential line. Thus it is possible to achieve simplification in structure and a reduction in space. Furthermore, it becomes very easy to maintain the electrically conductive line at a constant electric potential.

In a different preferred mode according to the second aspect of the present invention, the data line which drives a constant electric potential line includes first and second constant electric potential lines for supplying different constant electric potential power-supply to the data signal supplying means, the part of the electrically conductive line formed of the first constant electric potential line surrounds the first and second groups of image signal lines, on the substrate, and the part of the electrically conductive line formed of the second constant electric potential line surrounds the control signal lines on the first substrate.

In accordance with these features of the present invention, the first and second groups of image signal lines are surrounded on the substrate, for example, by the part of the electrically conductive line made up of the first constant electric potential line for supplying a negative power supply equal to a ground electric potential. The control signal lines are surrounded on the substrate, for example, by the part of the electrically conductive line made up of the second constant electric potential line for supplying a positive power supply. Thus, the image signal lines are doubly shielded from the control signal lines on the first substrate.

In a different preferred mode according to the second aspect of the present invention, the electrically conductive line is extended such that, on the substrate, the electrically conductive line surrounds an image display area defined by the plurality of pixel electrodes and also surrounds the plurality of data lines.

In accordance with these features of the present invention, because the image display area and the plurality of data lines are surrounded by the electrically conductive line on the substrate, the image display area and the plurality of data lines are shielded from the control signal lines such as the clock signal line. Thus, intrusion of high-frequency clock noise into the data signal output from the data signal supply means and to the data signal or the like input to the switching elements or the pixel electrodes is suppressed.

In a different preferred mode according to the second aspect. of the present invention, the electro-optical apparatus further comprises an opposite substrate located opposite to the substrate; and a light shielding frame disposed, along the contour of the image display area, on at least either the substrate or the opposite substrate, wherein the electrically conductive line includes a part formed on the substrate at a location opposite to the light shielding frame and along the light shielding frame.

In accordance with these features of the present invention, because the electrically conductive line is disposed on the substrate and under the light shielding frame, the required space on the TFT array substrate is reduced. More specifically, it is possible to find a sufficient area on the periphery of the substrate for forming the scanning line driving circuit and the data line driving circuit without having a reduction in the effective display area of the liquid crystal apparatus caused by formation of the electrically conductive line.

In a different preferred mode according to the second aspect of the present invention, the electrically conductive line and the data line are formed of the same metal material with a low resistance.

In accordance with these features of the present invention, because the electrically conductive line is formed of the same metal material with a low resistance as that used to form the data lines, such as Al (aluminum), the electrically conductive line may be extended along a long distance while maintaining the resistance of the electrically conductive line to a level low enough for practical use. That is, it becomes possible to extend the electrically conductive line in a zigzag fashion between other wirings or various circuits or the like along a long distance or over a wide area including the image display area or the like, without encountering a reduction in the shielding effects caused by the increase in resistance. Thus, it is possible to enhance the overall shielding effects using a rather simple structure. Furthermore, it is possible to form the electrically conductive line and the data lines using the same metal material with a low resistance in the same process during the production process of the electro-optical apparatus. That is, the increase in the processing steps resulting from the introduction of the electrically conductive line can be minimized.

In a different preferred mode according to the second aspect of the present invention, there is provided a capacitance line for adding a predetermined magnitude of capacitance to the pixel electrodes, wherein the capacitance line is connected to the electrically conductive line.

In accordance with these features of the present invention, because the predetermined magnitude of capacitance is added by the capacitance line to the pixel electrode, it becomes possible to display a high-precision image even when the duty ratio is small. Furthermore, because the capacitance line is connected to the electrically conductive line, it is possible to prevent negative effects from the variations in electric potential of the capacitance line on the switching elements and pixel electrodes. Furthermore, the electrically conductive line can also serve as a wiring for maintaining the capacitance line at a constant electric potential. Still furthermore, for example, the third external input terminal or the external input terminal for the electrically conductive line may be employed also as an external input terminal for inputting the constant electric potential at which the capacitance line is maintained.

In a different preferred mode according to the second aspect of the present invention, the electro-optical apparatus further comprises scanning signal supply means formed on the substrate, for supplying a scanning signal to said plurality of scanning lines line by line, wherein the electrically conductive line includes a part made up of a scanning line that drives a constant electric potential line for supplying a power supply which drives scanning lines of a constant electric potential to the scanning signal supply means.

In accordance with these features of the present invention, the image signal lines are electrically shielded from the control signal lines by the part of the electrically conductive line made up of the scanning line that drives a constant electric potential line. Therefore, even when the clock signal has a high frequency, intrusion of high-frequency clock noise from the control signal line to the image signal lines is suppressed.

In a different preferred mode according to the second aspect of the present invention, the scanning signal supply means is formed at both sides of an image display area defined by the plurality of pixel electrodes, and the part of the electrically conductive line made up of the scanning line that drives a constant voltage line is extended such that the part of the electrically conductive line surrounds the image display area and the plurality of data lines on the substrate and such that the scanning-line power-supply is supplied to the scanning line supply means in a redundant fashion.

In accordance with these features of the present invention, on the substrate, the image display area and the plurality of data lines are surrounded by the part of the electrically conductive line made up of the scanning line which drives a constant electric potential line so that the image display area and the plurality of data lines are also shielded by the control signal lines such as the clock signal line. Thus, intrusion of high-frequency clock noise or the like into the data signal output from the data signal supply means and to the data signal or the like input to the switching elements or the pixel electrodes is suppressed. Furthermore, because the part of the electrically conductive line made up of the scanning line that drives a constant electric potential line is extended such that the scanning-line driving power-supply is supplied in a redundant fashion to the scanning line supply means disposed at both sides of the image display area, even if breakage or disconnection occurs in the part of the electrically conductive line made up of the scanning line that drives a constant electric potential line or in other parts, the disconnection does not result in a fatal failure of the apparatus.

In a different preferred mode according to the second aspect of the present invention, the data signal supply means includes: a sampling circuit for sampling the image signal; and a data line driving circuit for driving the sampling circuit in accordance with the control signal, wherein the image signal lines included in the first group of image signal lines and the image signal lines included in the second group of image signal lines extend alternately in an area between the data line driving circuit and the sampling circuit at least every one or more image signal lines from both sides of the data line driving circuit in a comb fashion.

In accordance with these features of the present invention, the image signal lines included in the first group of image signal lines (for example, image signal lines VID1, VID3, VID5, VID7, . . . corresponding to the odd-numbered data lines) and the image signal lines included in the second group of image signal lines (for example, image signal lines VID2, VID4, VID6, VID8, . . . corresponding to the even-numbered data lines) extend alternately at least every one or more image signal lines from both sides of the data line driving circuit in the comb fashion. This allows the image signal lines and the data lines to be disposed in a systematic and well-balanced fashion around the data line driving circuit.

In a different preferred mode according to the second aspect of the present invention, the data signal supply means inverts the polarity of the voltage of the data signal every data line, wherein the image signal lines included in the first group of image signal lines and the image signal lines included in the second group of image signal lines extend, in a comb form, alternately every two image signal lines corresponding to adjacent two data lines from both sides of the data line driving circuit.

In accordance with these features of the present invention, the polarity of the voltage of the data signal is inverted line by line by the data signal supply means in a manner called 1S inversion, or dot inversion, thereby suppressing flicker in the displayed image. In this mode, the image signal lines included in the first group of image signal lines (for example, image signal lines VID1, VID2, VID5, VID6, . . . corresponding to two adjacent data lines, every four data lines) and the image signal lines included in the second group of image signal lines (for example, image signal lines VID3, VID4, VID7, VID8, . . . corresponding to two adjacent data lines, every four data lines) extend alternately every two image signal lines corresponding to adjacent two data lines, from both sides of the data line driving circuit in the comb fashion. As a result, the image signals supplied to two adjacent image signal lines become opposite in polarity to each other. Thus, noise components arising from the same noise source are canceled out between two adjacent image signal lines, and thus noise is suppressed.

The electro-optical apparatus according to the first or second aspect of the present invention may be used in an electronic device.

The electronic device provided with the electro-optical apparatus according to the present invention has the advantage in that high-frequency clock noise or the like is suppressed, and a high-quality image can be displayed.

These and other features and advantages of the present invention will become more apparent from the following detailed description referring to preferred embodiments.

BRIEF DESCRIPTION OF DRAWINGS

FIG. 5 is a schematic plan view illustrating in further detail the two-dimensional layout of the shielding lines according to the second embodiment.

DETAILED DESCRIPTION OF PREFERRED EMBODIMENTS

Embodiments of the present invention are described below with reference to the accompanying drawings. In the following description, a liquid crystal apparatus is taken as an example of an electro-optical apparatus according to the present invention.

First Embodiment
(Construction of Liquid Crystal Apparatus)

Figure 1:
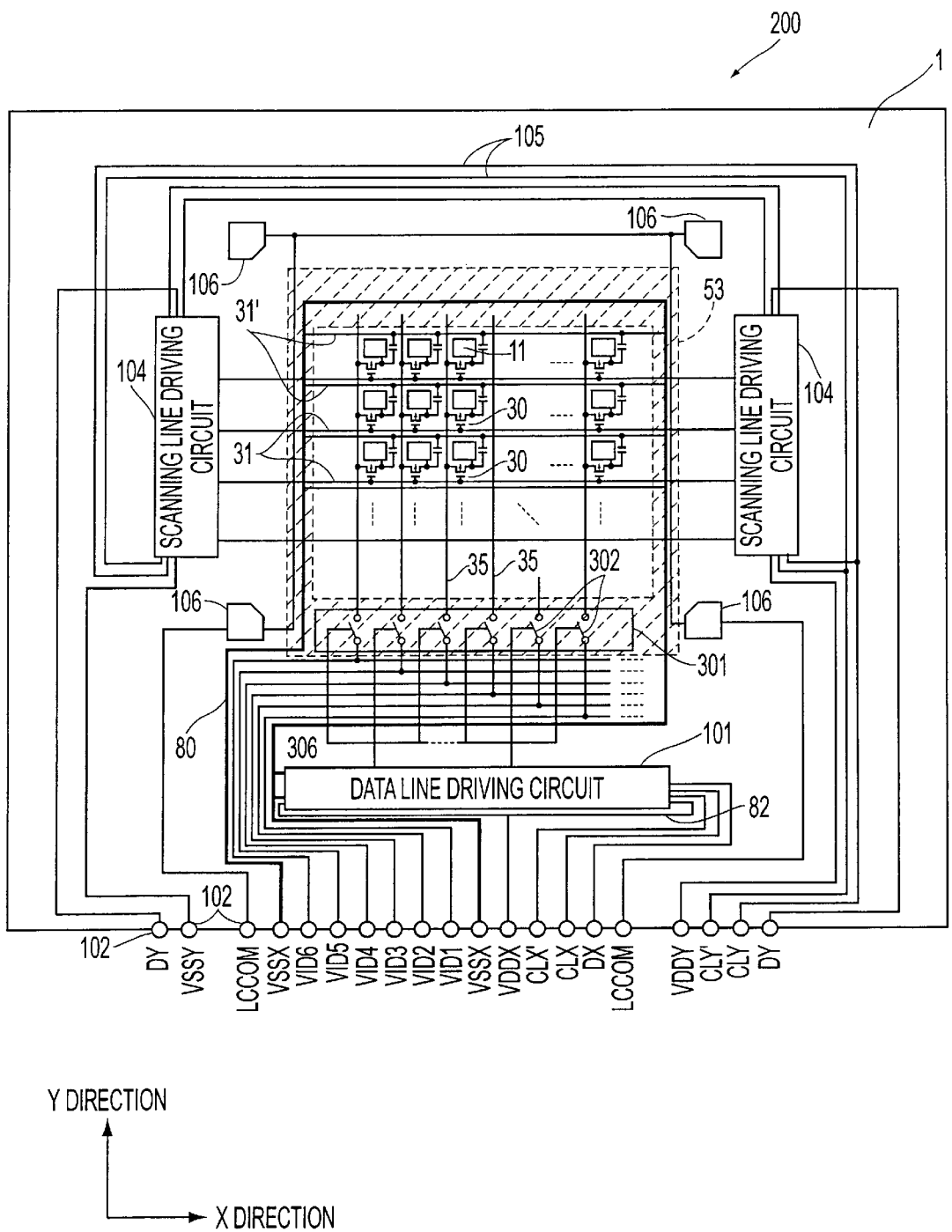
FIG. 1 is a schematic plan view illustrating various interconnection lines, including shielding lines and peripheral circuits and the like, formed on a TFT array substrate according to a first embodiment of the invention.
Figure 2:
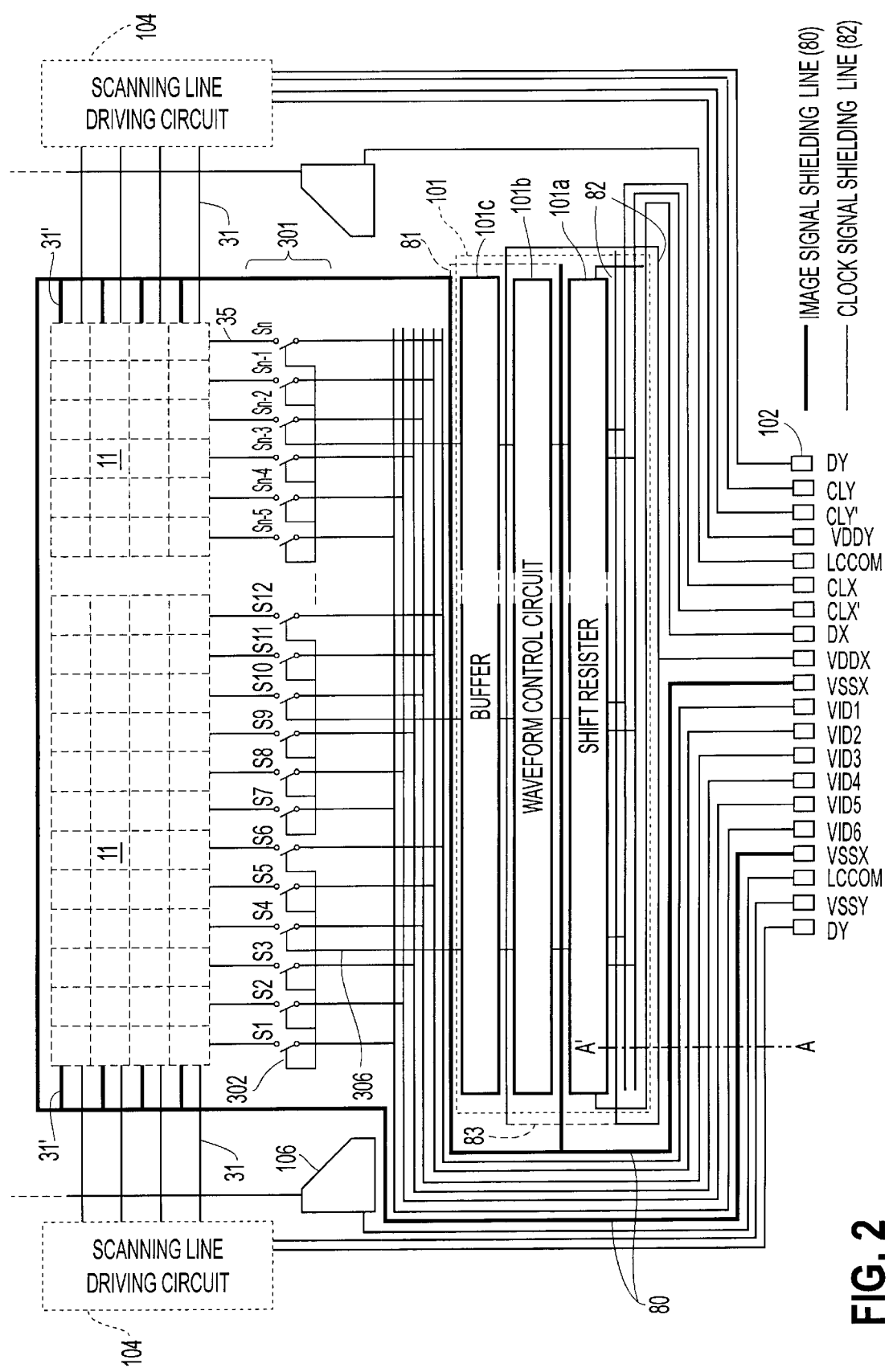
FIG. 2 is a schematic plan view illustrating in further detail the two-dimensional layout of the shielding lines according to the first embodiment.
Figure 3:
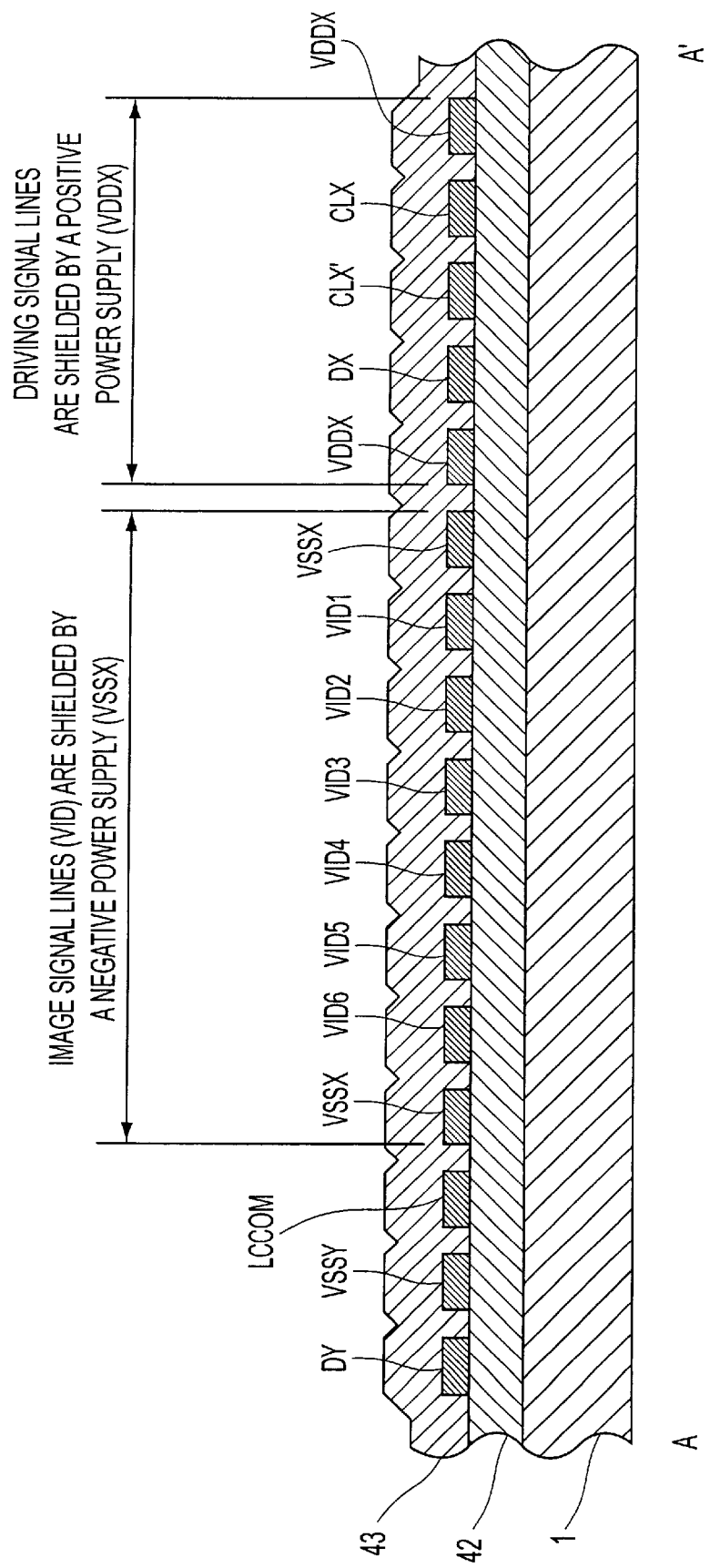
FIG. 3 is a cross-sectional view taken along line A—A' of FIG. 2, illustrating shielding lines, image signal lines, and clock signal lines, formed on a TFT array substrate.

A first embodiment of the present invention is described below with reference to FIGS. 1 to 3. FIG. 1 is a plan view illustrating various wirings, including electrically conductive lines (hereinafter referred to as shielding lines) and peripheral circuits and the like, formed on a TFT array substrate of a liquid crystal apparatus according to the embodiment of the invention. FIG. 2 is a plan view illustrating in further detail the two-dimensional layout of the shielding lines shown in FIG. 1. FIG. 3 is a cross-sectional view taken along line A—A' of FIG. 2, illustrating wirings such as shielding lines, image signal lines, and clock signal lines.

In FIG. 1, a liquid crystal apparatus 200 includes a TFT array substrate 1 made of for example quartz or hard glass. On the TFT array substrate 1, there are provided a plurality of pixel electrodes 11 formed in a matrix, a plurality of data lines 35 disposed side by side in an X direction, each extending in a Y direction, a plurality of scanning lines 31 disposed side by side in the Y direction, each extending in the X direction, and a plurality of TFTs 30 serving as an example of switching elements, each disposed between the respective data lines 35 and the respective pixel electrodes 11, wherein the plurality of TFTs 30 control the electric conduction or electric isolation between the respective data lines 35 and the respective pixel electrodes 11, in accordance with respective scanning signals supplied via the scanning lines 31. Furthermore, on the TFT array substrate 1, capacitance lines 31' (storage capacitance electrodes) for providing storage capacitance (refer to FIG. 9), which will be described later, are also formed in a direction parallel to the scanning lines 31.

Furthermore, a sampling circuit 301, a data line driving circuit 101, and scanning line driving circuits 104 are also formed on the TFT array substrate 1, whereby an example of the data-signal supply means is realized. At the upper side of an image display area defined by the plurality of pixel electrodes 11 (the image display area is a particular area of the liquid crystal apparatus where an image is displayed by changing the alignment of the liquid crystal), a plurality of wirings 105 are provided via which the scanning line driving circuits 104 formed at right and left sides of the image display area are connected to each other. Upper-to-lower conducting elements 106 are disposed at four corners of the image display area so that the TFT array substrate 1 and the opposite substrate are electrically connected via the upper-to-lower conducting elements 106. In the following description with reference to FIGS. 1 to 3, the names of signals input via external input terminals 102 disposed along a lower side of the TFT array substrate 1 and the names of the wirings for the respective signals are represented by the same alphabetic characters for convenience of description, wherein the name is put at a location following the term "signal" or "wiring" (for example, a clock signal having a name "CLX" is represented by "clock signal CLX" and the corresponding signal wiring is represented by "wiring CLX").

A negative power supply VSSY and a positive power supply VDDY are supplied to the scanning line driving circuits 104 from an external control circuit via the external input terminals 102 and further via wirings VSSY and VDDY. Using these power supplies, the scanning line driving circuits 104 start shift register circuits provided therein in response to a scanning line driving circuit start signal DY. Furthermore, at a predetermined timing based on a reference clock signal CLY for the scanning line driving circuit and an inverted clock signal CLY' thereof, supplied via the external input terminals 102 and wirings CLY and CLY', the scanning line driving circuits 104 apply a scanning signal in the form of a pulse to the scanning lines 31, line by line.

A negative power supply VSSX and a positive power supply VDDX for the data line driving circuit are supplied to the data line driving circuit 101 from the external control circuit via external input terminals 102, and further via wirings VSSX and VDDX. Using these power supplies, the data line driving circuit 101 starts the shift register circuits provided therein in response to a data line driving circuit start signal DX. Furthermore, in response to receipt of a reference clock signal CLX for the data line driving circuit and an inverted clock signal CLX' thereof supplied via external input terminals 102 and wirings CLX and CLX', the data line driving circuit 101 supplies a sampling circuit driving signal to the sampling circuit driving signal lines 306.

The sampling circuit 301 includes TFTs 302 provided in the respective data lines 35. The source electrodes of respective TFTs 302 are connected to wirings VID1 to VID6, respectively. The gate electrodes of the TFTs 302 are connected to the corresponding sampling circuit driving signal lines 306. Image signals VID1 to VID6, which are supplied via external input terminals 102 and wirings VID1 to VID6 after being converted from a serial form into a six-phase parallel form, are sampled by the sampling circuit 301 in response to the sampling circuit driving signal supplied from the data line driving circuit 101 via the sampling circuit driving signal lines 306. The sampled image signals VID1 to VID6 are applied to every group in sequence, wherein each group consists of six adjacent data lines 35.

As described above, the image signals VID1 to VID6 serial-to-parallel converted into six phases are supplied as data signals to the data lines 35 by the data line driving circuit 101 and the sampling circuit 301. In this specific embodiment, sampling circuits 301 connected to six adjacent data lines 35 are selected at the same time so that data signals are supplied group by group, wherein each group consists of six data lines 35. However, the data lines 35 may be selected line by line, or adjacent two, three, . . . , five, or seven or more data lines may be selected at the same time. Furthermore, the image signals supplied to the data lines 35 may be serial-to-parallel converted not only into six phases but also into five or less phases if the TFTs 302 of the sampling circuit 301 have good writing performance, or into seven or more phases if the frequency of the image signals is high. Herein, it is required that the number of input external terminals 102 for the image signals and the number of image signal lines have to be equal to the number of phases of the image signals converted from the serial form to the parallel form.

As shown in FIG. 2, the data line driving circuit 101 includes: a shift register circuit 101a which starts, in response to receipt of a start signal DX, generation of a sequence of transfer signals in synchronization with the reference clock signal CLX and its inverted clock signal CLX'; a waveform control circuit 101b and a buffer circuit 101c which shape the waveform of the transfer signals received from the shift register circuits 101a, buffer it, and supply it to the sampling circuit 301 via the sampling circuit driving signal line 306. The sampling circuit 301 includes a plurality of groups of TFTs 302, wherein each group includes six TFTs corresponding to six phases of serial-to-parallel-converted image signals VID1 to VID6. Six TFTs 302 of each group are connected in parallel to respective sampling circuit driving signal lines 306. More specifically, switches S1 to S6 realized by TFTs 302 are connected to a first sampling circuit driving signal line 306 on the extremely left side, and switches S7 to S12 are connected to a second sampling circuit driving signal line 306 next to the first one. A sampling circuit driving signal line 306 on the extremely right side is connected to switches Sn-5 to Sn.

In particular, in the present embodiment, as shown in FIGS. 1 and 2, a constant electric potential shielding line 80 which serves as a wiring VSSX for supplying a negative power supply VSSX and a constant electric potential shielding line 82 which also serves as a wiring VDDX for supplying a positive power supply VDDX are formed on the TFT array substrate 1. These shielding lines 80 and 82 electrically shield the wirings VID1 to VID6 from the wirings CLX and CLX'. Thus, even when the clock signal CLX has a high frequency, intrusion of high-frequency clock noise from the wirings CLX and CLX' to the wirings VID1 to VID6 is suppressed.

The scanning line driving clock signal CLY (and also its inverted clock signal CLY') has a frequency much lower than the frequency of the above-described data line driving clock signal CLX (and its inverted clock signal CLX'). Therefore, the clock signals CLY and CLY' do not cause a significant problem associated with high-frequency clock noise. In the present embodiment, however, as shown in FIGS. 1 and 2, the wirings VID1 to VID6 are also shielded from the wirings CLY and CLY' by the shielding lines 80 and 82. The shielding line 80, which also serves as the negative power supply VSSX for the data line driving circuit 101 extends, starting from an external input terminal 102, under the light shielding frame 53 provided on the opposite substrate 2 such that the image display area is surrounded by the shielding line 80. This arrangement makes it possible to suppress intrusion of noise from peripheral circuits, not only to the image signal wirings VID1 to VID6, but also to the data lines 35 to which data signals are written via the TFTs 302 of the sampling circuit 301.

In the present embodiment, the wirings VSSX and VDDX are extended such that they also serve as shielding lines 80 and 82. That is, external input terminals and wirings are shared for different purposes and thus simplification of the structure of the apparatus and a reduction in space can be achieved. By sharing the same lines for both the shielding lines 80 and 82 and the constant electric potential lines, it becomes possible to easily maintain the shielding lines 80 and 82 at constant electric potential. However, the power supply wirings and shielding lines may be formed separately.

If the power supply voltage for driving a data line driving circuit 101 and that for driving a scanning line driving circuit 104 are equal to each other, then the electric potentials of positive power supplies (positive electric potentials) VDDX and VDDY may be provided by a shared single positive power supply and the electric potentials of negative power supplies (negative electric potentials) VSSX and VSSY may be provided by a shared single negative power supply. This allows reductions in the numbers of external input terminals and wirings extending from the external input terminals.

In the present embodiment, as described in FIG. 2, two external input terminals 102 are provided for inputting a negative power supply VSSX and there are two wirings VSSX corresponding to the respective external input terminals 102. The wirings VID1 to VID6 extending on the TFT array substrate 1 are surrounded by the shielding line 80 maintained at the electric potential (negative electric potential) provided by the negative power supply VSSX. The shielding line 80 made of the same metal layer as that used to form the data lines 35, such as Al, extends between the shift register circuit 101a and the waveform control circuit 101b. The end of the extending shielding line 80 is connected, as will be described in further detail later, to the shielding line 80 via a shielding line conjunction part 81 which is made of the same electrically conductive layer as that used to form the scanning lines 31, for example, such as a polysilicon layer, and which extends under the metal layer, such as Al, via a first interlayer insulating layer, such that the waveform control circuit 101b and the buffer circuit 101c are surrounded by the extending shielding line 80.

On the other hand, as shown in FIG. 2, in the area adjacent to the data line driving circuit 101 on the TFT array substrate 1, the wirings CLX and CLX' are surrounded by the shielding line 82 maintained at the electric potential (positive electric potential) provided by the positive power supply VDDX. The shielding line 82 made of the same metal layer that used to form the data lines 35, such as Al, extends between the waveform control circuit 101b and the buffer circuit 101c. The end of the extending shielding line 82 is connected to the shielding line 82 via a shielding line conjunction part 83 which is made of the same electrically conductive layer as that used to form, for example, the scanning lines 31, for example, such as a polysilicon layer, such that the waveform control circuit 101b and the shift register circuit 101a are surrounded by the extending shielding line 82.

Thus, the wirings VID1 to VID6 are doubly shielded from the wirings CLX and CLX' on the TFT array substrate 1. Furthermore, the shift register circuit 101a, the waveform control circuit 101b, and the buffer circuit 101c are shielded in a highly reliable fashion. However, even when the above-described surrounding structure is not employed, if at least either one of the shielding lines 80 or 82 is disposed between the wirings CLX, CLX' and the wirings VID1–VID6, then shielding effects may be achieved to a certain degree.

In the present embodiment, as shown in FIGS. 1 and 2, the wirings VID1 to VID6 extend on the TFT array substrate 1 in a direction opposite to the direction in which the wirings CLX and CLX' extend with respect to the data line driving circuit 101 (that is, the former wirings extend in a clockwise direction and the latter wirings extend in a counterclockwise direction). This results in a large overall distance between the former and latter wirings. Furthermore, electromagnetic waves propagating between these wirings are suppressed by the data line driving circuit 101 disposed between them. Therefore, even when the frequency of the clock signals CLX and CLX' is high, intrusion of high-frequency clock noise from the wirings CLX and CL' to the wirings VID1 to VID6 is effectively suppressed. The extending direction of the wirings CLX and CLX' and that of the wirings VID1 to VID6 may be replaced with each other. That is, the wirings CLX and CLX' may be shielded by the negative power supply VSSX and the wirings VID1 to VID6 may be shielded by the positive power supply VDDX. When the wirings do not extend in directions opposite to each other, if at least one shielding line 80 or 82 is disposed between the wirings CLX, CLX' and the wirings VID1 to VID6, then the shielding effects can be obtained to a certain degree.

In the present embodiment, the external input terminals 102 for the clock signals CLX and CLX' are spaced by a predetermined distance from the external input terminals 102 for the image signals VID1 to VID6 and three external input terminals 102 for the negative power supply VSSX, the positive power supply VDDX and the start signal DX are disposed in the space. Preferably, the external input terminals 102 are formed in a peripheral area of the TFT array substrate 1 such that the external input terminals 102 for the clock signals CLX and CLX' are separated as far apart as possible from the external input terminals 102 for the image signals VID1 to VID6, and at least one external input terminal 102 is disposed between those terminals described above. As a result of the above arrangement, the image signal lines encounters less intrusion of high-frequency clock noise from the clock wirings compared with the case where the image signal lines and the clock signal lines are disposed adjacent to each other.

In the present embodiment, as shown in FIGS. 1 and 2, the image display area and the plurality of data lines 35 are surrounded by the shielding line 80 on the TFT array substrate 1. As a result, the image display area and the plurality of data lines 35 are also shielded from the wirings CLX and CLX'. Thus, high-frequency clock noise to the sampling circuit driving signal output from the data line driving circuit 101 and the data signals input to the TFTs 30 or the pixel electrodes 11 is also suppressed. However, even when the image display area is not surrounded by such wirings, if the wirings VID1 to VID6 are shielded by the shielding line 80 or 82 over the range to the sampling circuit 301, then the shielding effects can be obtained to a certain degree.

As can be seen from the cross-sectional view of FIG. 3, various wirings DY, VSSY, . . . , VDDX including the shielding lines 80 and 82 connected to the corresponding external input terminals 102 are made of the same low-resistance metal material as that used to form the data lines 35, such as Al (aluminum). Therefore, even if the shielding lines 80 and 82 extend over a rather long distance, the resistance of the shielding lines 80 and 82 can be still low enough. That is, as shown in FIG. 2, the shielding line 82 may extend in a zigzag fashion over a long distance passing through the space among the other various wirings, the shift register circuit 101a, the waveform control circuit 101b, and the buffer circuit 10c. The shielding line 80 may extend over a long distance around a large area including the image display area. Thus, it is possible to achieve effective shielding using a rather simple structure. As shown in FIG. 3, the various wirings DY, VSSY, . . . , VDDX including the shielding lines 80 and 82 connected to the corresponding external input terminals 102 are formed on a first interlayer insulating layer 42 on the TFT array substrate 1. That is, they are formed on the same layer. This allows achievement of further effective shielding effects. This structure allows the various wirings DY, VSSY, . . . , VDDX to be formed at the same time using the same low-resistance metal layer, such as an Al layer, in the same process during the production process of the liquid crystal apparatus 200.

In FIGS. 1 to 3, a signal LCCOM is input as a power supply of a common electrode via an external input terminal 102, and supplied via an wiring LCCOM and also via the upper-to-lower conducting elements 106, described earlier, to a common electrode (refer to FIG. 10) provided on an opposite substrate, which will be described later.

Second Embodiment

Now, a second embodiment is described below. The second embodiment is similar in construction to the first embodiment, and thus similar elements to those of the first embodiment, are denoted by similar reference numerals, and they are not described in further detail here. Only those parts which are different from the first embodiment are described below.

(Construction of Liquid Crystal Apparatus)

Figure 4:
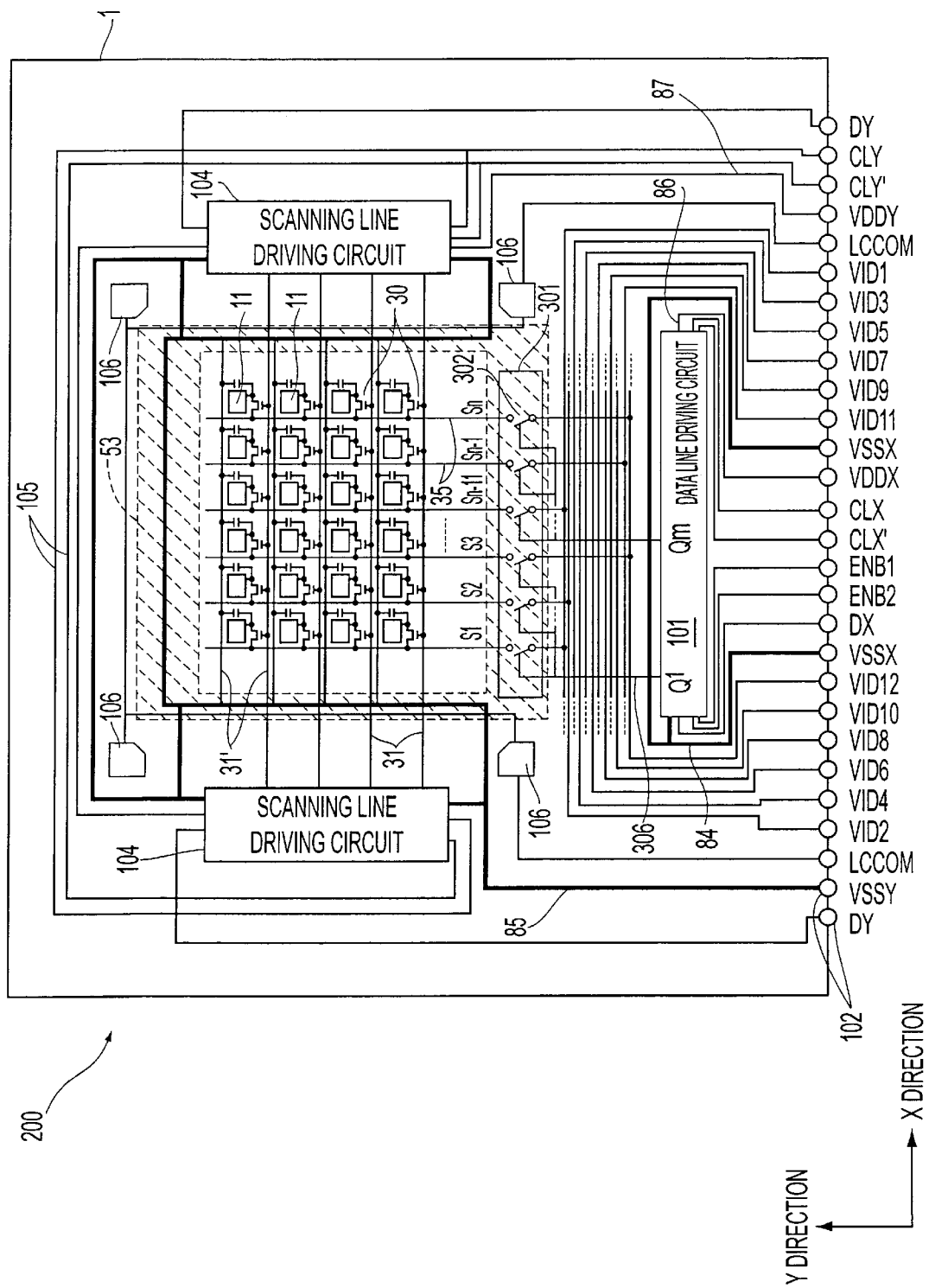
FIG. 4 is a schematic plan view illustrating various interconnection lines including shielding lines and peripheral circuits and the like, formed on a TFT array substrate according to a second embodiment of the invention.

Referring to FIGS. 4 to 8, the construction of the second embodiment is described below. FIG. 4 is a plan view illustrating various interconnection lines including shielding lines and peripheral circuits or the like, formed on a TFT array substrate of a liquid crystal apparatus of the present embodiment. FIG. 5 is a plan view illustrating in further detail the two-dimensional layout of the shielding lines shown in FIG. 4. FIG. 6(a) is a circuit diagram of the shift register circuit shown in FIG. 5 and FIG. 6(b) is a timing chart associated with the shift register circuit. FIGS. 7(a)–(b) are a cross-sectional view of various interconnections lines including the shielding lines, image signal lines, and clock signal lines formed on the TFT array substrate, taken along lines B—B' and C—C' of FIG. 5. FIG. 8(a) is a schematic plan view illustrating an example of a two-dimensional layout of the image signal lines shown in FIG. 1, and FIG. 8(b) is a schematic plan view illustrating another example.

The sampling circuit 301 includes TFTs 302 provided in the respective data lines 35. The source electrodes of respective TFTs 302 are connected to wirings VID1–VID12, respectively. The gate electrodes of the TFTs 302 are connected to the corresponding sampling circuit driving signal lines 306. Image signals VID1–VID12, which are supplied via external input terminals 102 and wirings VID1–VID12 after being converted from a serial form into, for example, a twelve-phase parallel form, are sampled by the sampling circuit 301 in response to the sampling circuit driving signal supplied from the data line driving circuit 101 via the sampling circuit driving signal lines 306. The sampled image signals VID1–VID12 are applied to every group, wherein each group consists of twelve adjacent data lines 35.

As described above, the image signals VID1–VID12 serial-to-parallel converted into twelve phases are supplied as data signals to the data lines 35 via the data line driving circuit 101 and the sampling circuit 301. Although in the above specific example, the image signals are supplied to the data lines group by group, wherein each group consists of twelve data lines, the present embodiment has no particular limitation as in the first embodiment in terms of the number of data lines included in each group. In the present embodiment, as will be described in further detail below, the interconnection lines VID1–VID12 extend from both sides of the data line driving circuit 101. This allows a great number of wirings (the number of serial-to-parallel-converted phases) to extend on the TFT array substrate 1 such that they are distributed in a well balanced fashion over the TFT array substrate 1. The number of serial-to-parallel-converted phases may be equal to the number of sampling circuits 301 which are selected at a time, or the former number may greater than the latter number.

As shown in FIG. 5, the data line driving circuit 101 includes a shift register 101a which starts, in response to receipt of a start signal DX, generation of a sequence of transfer signals in synchronization with the reference clock signal CLX and its inverted clock signal CLX', a waveform control circuit 101b and a buffer circuit 101c which shape the waveform of the transfer signals received from the shift register circuits 101a, and buffers the output of the waveform control circuit 101b, and then supplies it to the sampling circuit 301 via the sampling circuit driving signal line 306. The sampling circuit 301 includes a plurality of groups of TFTs 302, wherein each group includes twelve TFTs corresponding to twelve phases of serial-to-parallel-converted image signals VID1–VID12. Twelve TFTs 302 of each group are connected in parallel to the sampling circuit driving signal lines 306. More specifically, switches S1 to S2 realized by TFTs 302 are connected to a first sampling circuit driving signal line 306 on the extremely left side, and switches S13 to S24 are connected to a second sampling circuit driving signal line 306 next to the first one. A sampling circuit driving signal line 306 on the extremely right side is connected to switches Sn-5 to Sn. Enable signals (control signals) ENB1 and ENB2 shown in FIG. 5 are input to an enable circuit provided in the waveform control circuit 101b. The enable circuit limits the width of pulses sequentially output from the shift register circuit 101a to the width of pulses of enable signals ENB1 and ENB2, thereby controlling the selection period of the sampling circuits 301. This prevents generation of a ghost on the data lines 35 which receive the image signal from the same wirings (VID1–VID12) every twelve data lines. Therefore, the enable signals ENB1 and ENB2, like the clock signals CLX and CLX', are high-frequency control signals whose repetition period is shorter than the horizontal scanning period. On the other hand, the start signal DX input to the shift register circuit 101a, like the clock signals CLY and CLY' and the start signal DY input to the shift register of the scanning line driving circuit side, is a low-frequency control signal whose repetition period is not shorter than the horizontal scanning period. to the shift register circuit 101a, like the clock signals CLY and CLY' and the start signal DY input to the shift register of the scanning line driving circuit side, is a low-frequency control signal whose repetition period is not shorter than the horizontal scanning period.

Figure 6A:
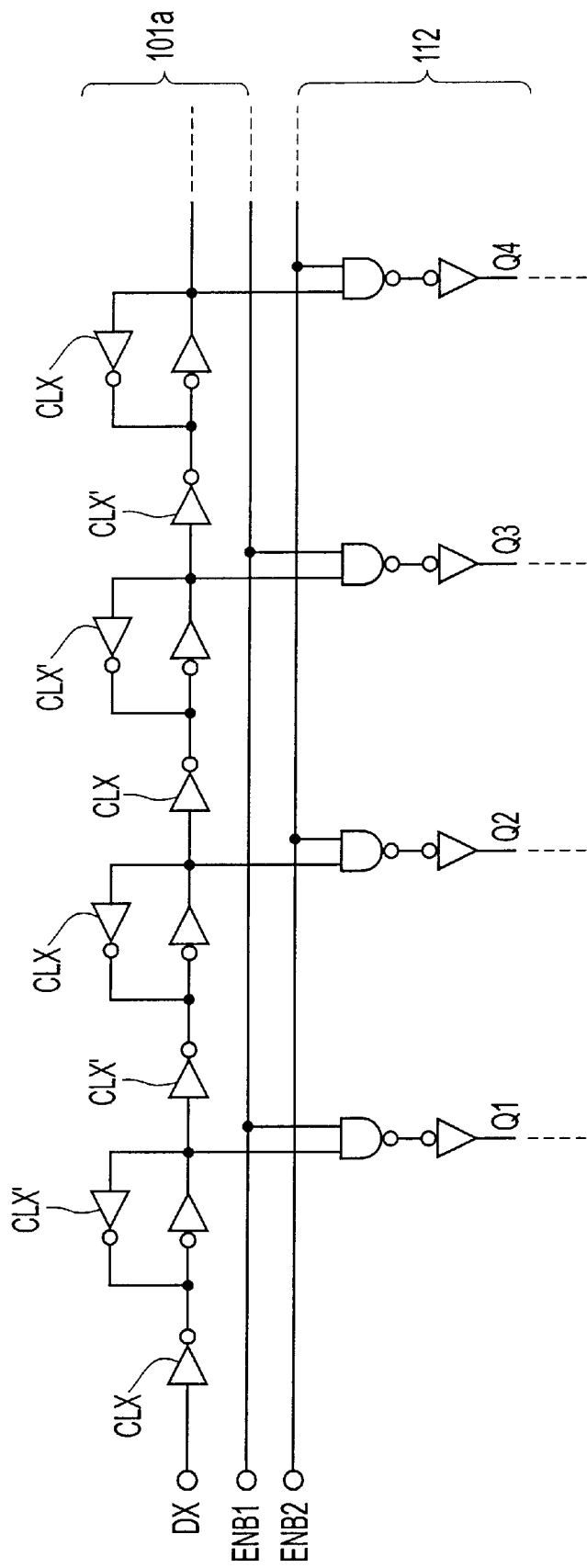
FIG. 6(a) is a circuit diagram of a shift register circuit according to the second embodiment of the invention.

A specific circuit configuration of the shift register circuit 101a and its operation are described below with reference to FIGS. 6(a)–(b). FIG. 6(a) is a circuit diagram of the shift register circuit including enable circuits, and FIG. 6(b) is a timing chart of various signals associated with this shift register circuit.

As shown in FIG. 6(a), an enable circuit 112 is connected to the output of each stage of the shift register circuit 101a. Each stage of the shift register circuit 101a includes two clocked inverter which transfers a transfer signal by means of a feedback to the following stage each time the binary levels of the reference clock signal CLX and its inverted signal CLX' vary at a predetermined frequency, so that the transfer signal is output from the respective stage in a sequential fashion in a right direction (from left to right). Each enable circuit 112 includes a NAND circuit which calculates an exclusive AND between the transfer signal and the enable signal ENB1 or ENB2, and also includes an inverter circuit which inverts the result of the NAND circuit, whereby the pulse width of the transfer signal output from the odd-numbered stages of the shift register circuit 101a is limited to the pulse width of the first enable signal ENB1, and the pulse width of the transfer signal output from the even-numbered stages is limited to the pulse width of the second enable signal ENB2. A signal DX for starting the operation of transferring the transfer signal is applied to the shift resister circuit 101a from the left side in FIG. 6(a).

Figure 6B:
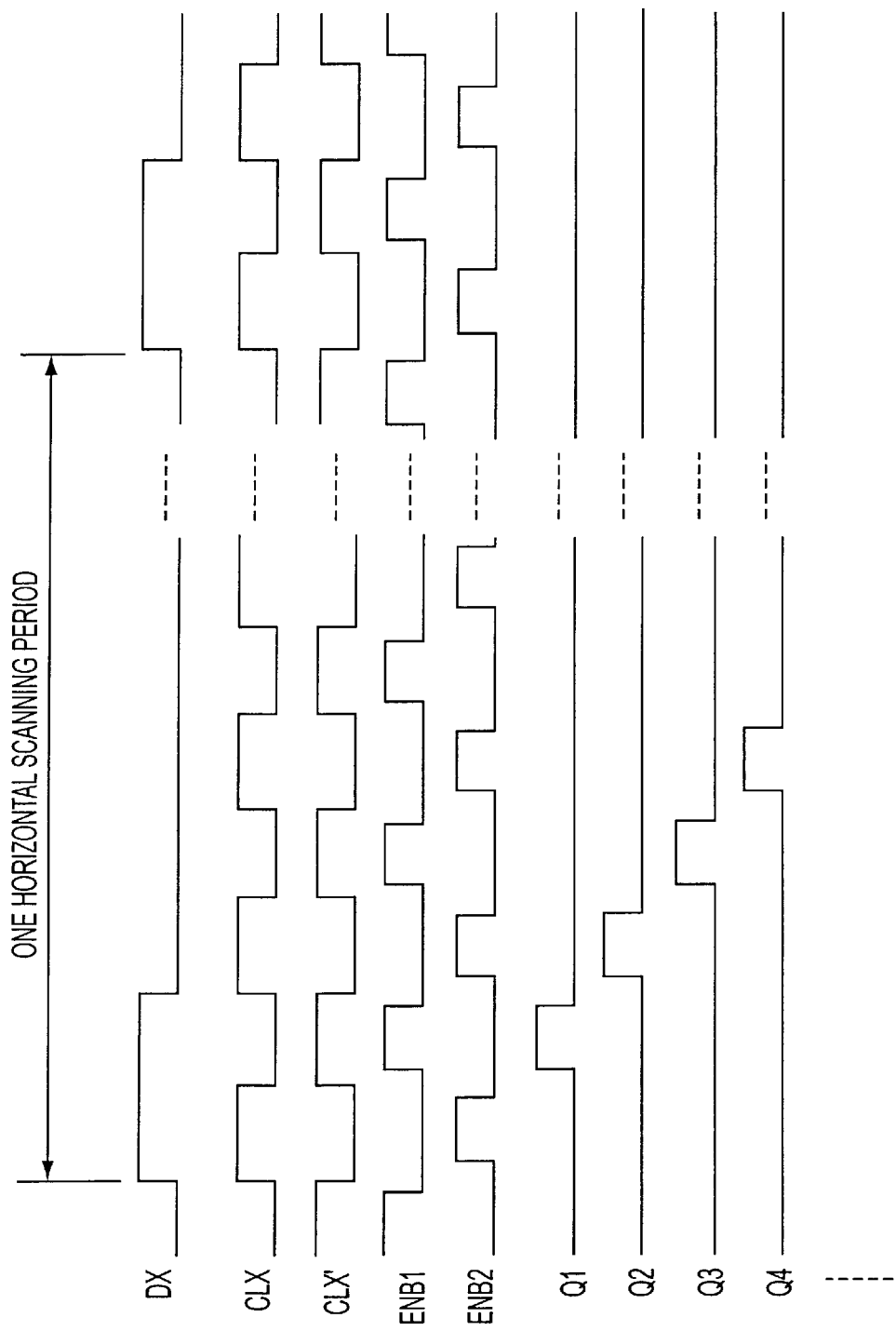
FIG. 6(b) is a timing chart associated with it.
Figure 7A:
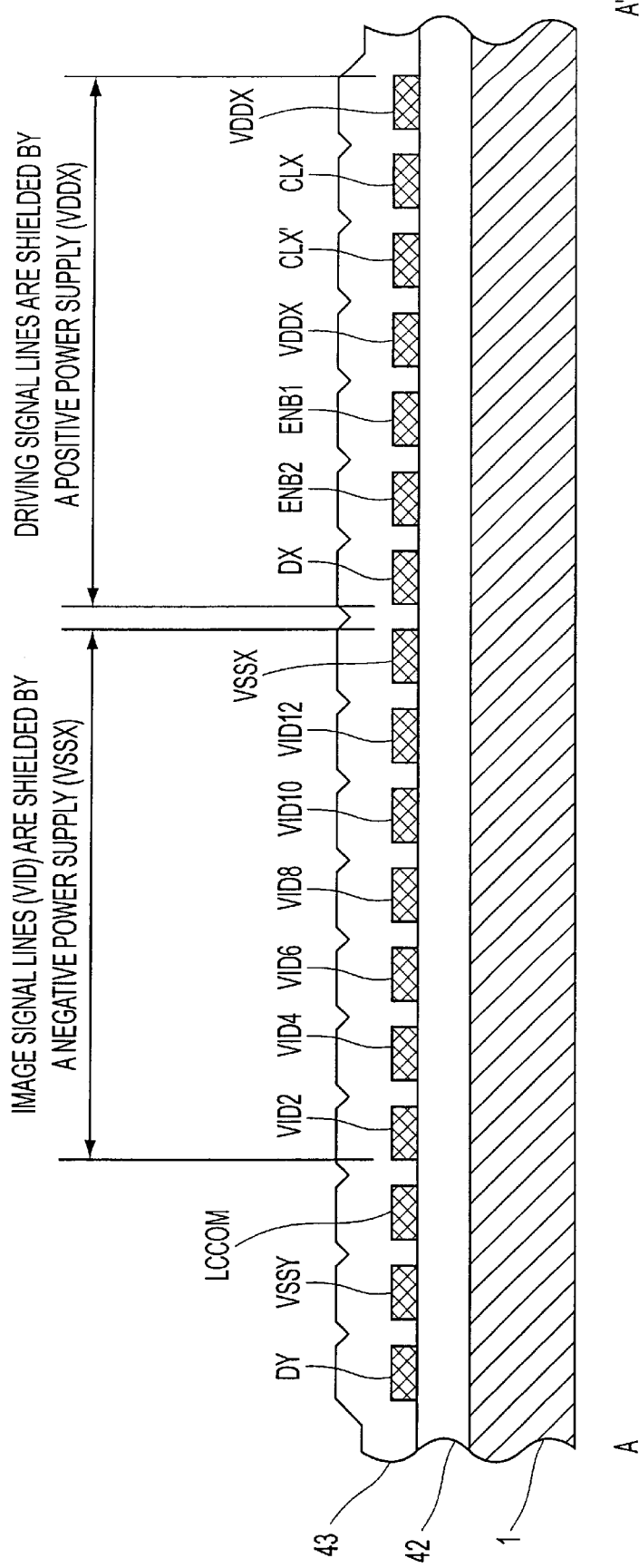
FIG. 7(a) is a cross-sectional view taken along line C—C' of shielding lines, image signal lines, and clock signal lines formed on the TFT array substrate of FIG. 5.
Figure 7B:
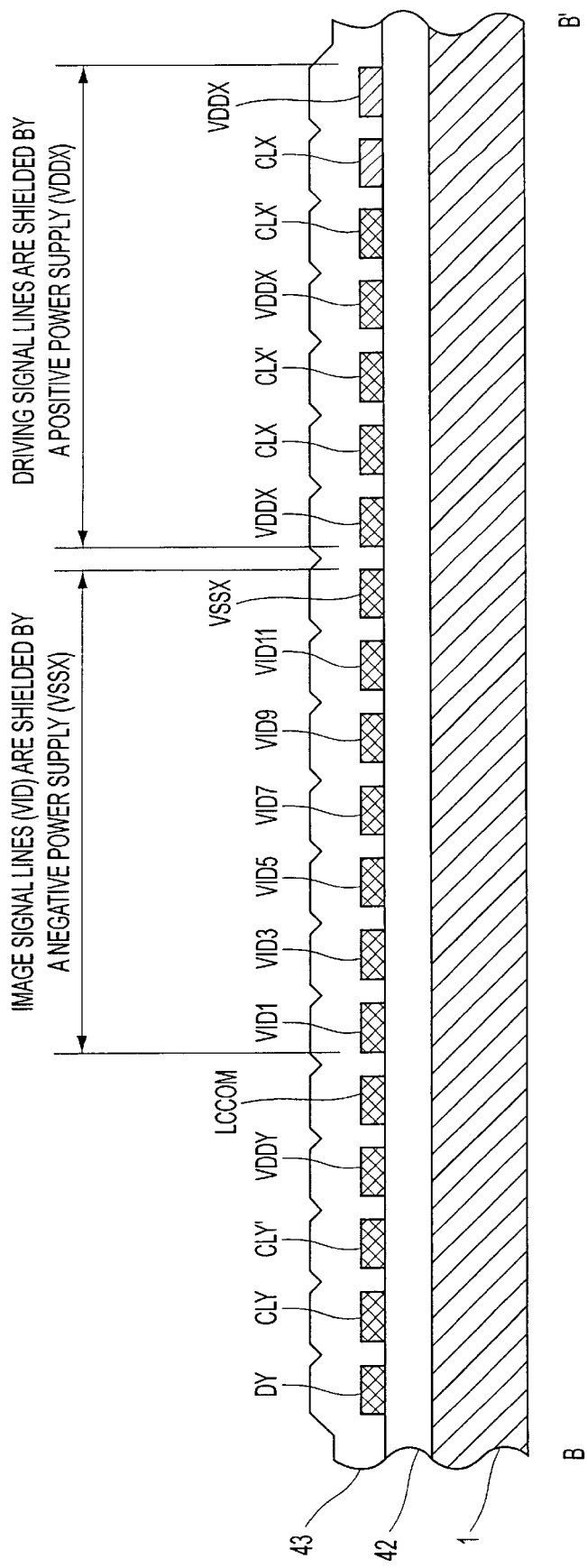
FIG. 7(b) is a cross-sectional view taken along line B—B' of FIG. 5.
Figure 8A:
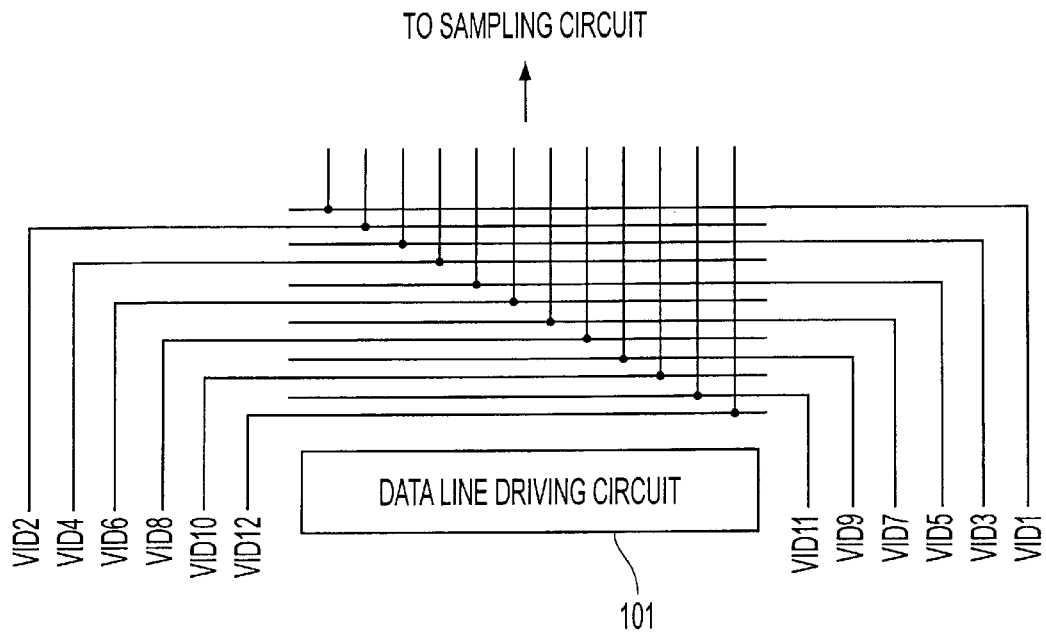
FIG. 8(a) is a schematic plan view illustrating an example of a two-dimensional layout of the image signal lines (wires VID1–12) shown in FIG. 4.
Figure 8B:
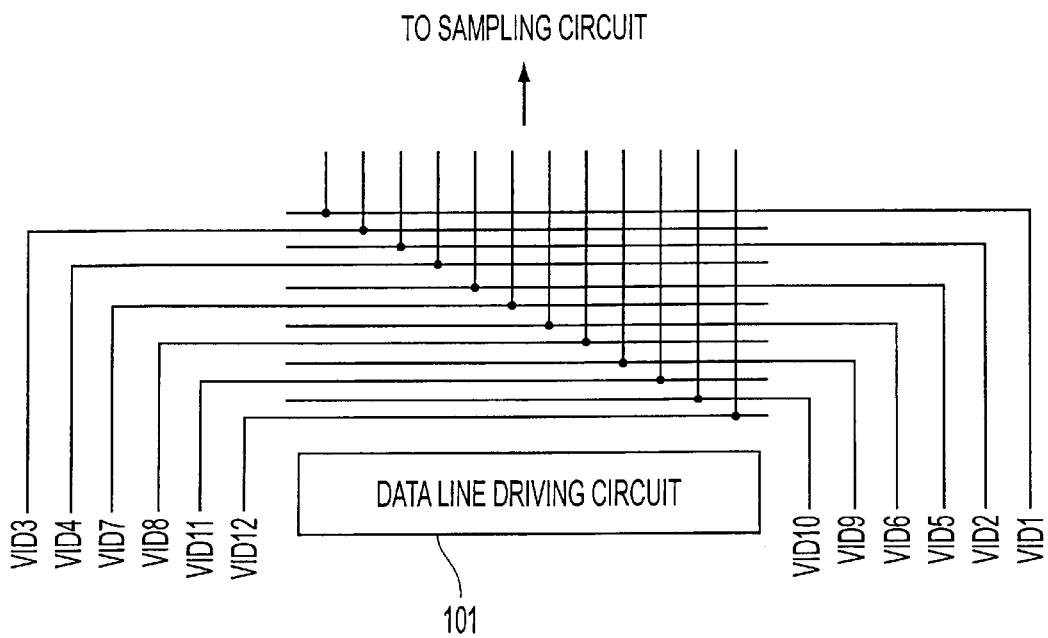
FIG. 8(b) is a schematic plan view illustrating another example.

If the signal DX, the clock signal CLX, its inverted signal CLX', and the first and the second enable signals ENB1 and ENB2 are input at times shown in the timing chart of FIG. 6(b), transfer signals are sequentially output from the shift register circuit 101a such that each output is delayed from the output from the preceding stage by a half of one period of the clock signal CLX. The pulse width of each output of the transfer signal is limited to the pulse width of the signal ENB1 or ENB2 by the enable circuit 112, and thus sampling circuit driving signals Q1, Q2, Q3, . . . , Qm (m is an odd number), each having a pulse width smaller than the pulse width of the clock signal CLX, are sequentially supplied to the sampling circuits 301 via the waveform control circuit 101b and the buffer circuit 101c shown in FIG. 2.

In the present embodiment, as shown in FIGS. 4 and 5, a constant electric potential shielding line 84 also serving as a wiring VSSX for a negative power supply VSSX, a constant electric potential shielding line 85 also serving as a wiring VSSY for a negative power supply VSSY, a constant electric potential shielding line 86 also serving as a wiring VDDX for a positive power supply VDDX, and a constant electric potential shielding line 87 also serving as a wiring VDDY for a positive power supply VDDY are formed on the TFT array substrate 1. The wirings VID1–VID12 serving as the image signal lines are electrically shielded by these shielding lines 84, 85, 86, and 87 from the wirings CLX and CLX' and also from the wirings ENB1 and ENB2. Thus, even when the clock signal CLX has a high frequency, intrusion of high-frequency clock noise from the high-frequency control signal lines such as wirings CLX, CLX', ENB1, and ENB2 to the wirings VID1–VID12 is suppressed.

Furthermore, as shown in FIG. 4 and FIG. 5, odd-numbered image signal lines VID1, VID3, VID5, VID7, VID9, and VID11, which are, by example, members of a first group of image signal lines, extend along an X direction side of the data line driving circuit 101 on the TFT array substrate 1 while even-numbered image signal lines VID2, VID4, VID6, VID8, VID10, and VID12, which are, by example, members of a second group of image signal lines, extend along an X direction side of the data line driving circuit 101 opposite thereto on the TFT array substrate 1 . Thus, in this technique, it is possible to reduce the frequency of the image signals VID1–VID12 supplied to the sampling circuit 301 by means of serial-to-parallel conversion into a rather large number of phases, such as twelve phases, wherein the great number of wirings VID1–VID12 are disposed at both sides of the data line driving circuit 101, such that they are distributed in a well-balanced fashion. This makes it possible to easily allocate a desired area on the TFT array substrate 1 for forming the data signal supply means including the sampling circuit 301 and the data line driving circuit 101, and thus it becomes possible to form a large image display area using a substrate with a limited size.

In the present embodiment, as shown in FIG. 5, the wirings VID1 to VID12 serving as the image signal lines are electrically shielded by the constant electric potential shielding line 84 from the high-frequency control signal lines, such as interconnection lines CLX, CLX', ENB1, and ENB2, for supplying high-frequency control signals, such as clock signals CLX and CLX' and enable signals ENB1 and ENB2. Thus, even when the clock signal has a high frequency, intrusion of high-frequency clock noise from the high-frequency control signal lines to the wirings VID1–VID12 is suppressed. On the other hand, the start signals DX and DY and also the clock signals CLY and CLY' are low-frequency control signals, and thus they do not cause high-frequency noise to the image signals on the wirings VID1–VID12 or to the data signals generated based on the image signals and supplied over the data signal lines 35. Therefore, the wirings DX, DY, CLY and CLY' which are low-frequency control signal lines may or may not be shielded by a constant electric potential shielding line. In the present embodiment, as shown in FIG. 5, the wirings VID1, VID3, . . . VID1 on the right side are shielded from the wirings DY, CLY and CLY' by the shielding line 87 including the constant electric potential wiring VDDY, while the wirings VID2, VID4, . . . VID12 on the left side are shielded from the wirings DY by the shielding line 85 including the constant electric potential wiring VSSY. The wirings VID2, VID4, . . . , VID12 are shielded from the wiring DX by the shielding line 84.

In the present embodiment, of the group of the image signal lines on the forward side in the X direction (the odd-numbered image signal lines), the wiring VID11, which is located closest to the wirings CLX and CLX' which are high-frequency control signal lines, is physically spaced and electrically shielded from the wirings CLX and CLX' by two shielding lines 84 and 86 including wirings VSSX and VDDX. Of the group of the image signal lines on the opposite side in the X direction (the even-numbered image signal lines), the wiring VID12, which is located closest to the wirings CLX and CLX' which are high-frequency control signal lines, is physically spaced and electrically shielded from the wirings CLX and CLX' by one shielding line 84 including the wiring VSSX. That is, the low-frequency control signal line DX which does not cause high-frequency noise to the image signal or the data signal is disposed together with the shielding line 84 between the high-frequency control signal lines CLX and CLX' and the wiring VID12, thereby further reducing negative effects, such as clock noise, of the wirings CLX and CLX' on VID12. In general, attenuation of electromagnetic waves occurs depending on the distance and presence of an obstacle. Therefore, it is possible to reduce clock noise by attenuating the electromagnetic wave which can cause clock noise by disposing as many wirings as possible such as shielding lines (constant electric potential lines such as wirings 84, 85, 86, 87) or low-frequency control signal lines (wirings such as DX, DY, CLY, CLY' for being supplied low-frequency control signal) between the wirings CLX, CLX', ENB1, and ENB2 and the wirings VID1–VID12. In addition to the shielding lines, disposing a low-frequency control signal line between the high-frequency control signal lines and the image signal line is effective to efficiently use the space on the TFT substrate 1, and also to reduce noise.

In the present embodiment, as shown in FIG. 5, external input terminals 102 connected to the respective wirings VID1–VID12 are disposed in two peripheral areas on right and left sides of the TFT array substrate 1, and external input terminals 102 connected to the wirings ENB1, ENB2, CLX' and CLX are disposed between the two peripheral areas. An external input terminal 102 connected to a shielding line 84 (wiring VSSX) is disposed between the external input terminal 102 connected to the wiring VID12 and the external input terminal 102 connected to the wiring ENB1. An external input terminal 102 connected to a shielding line 85 (wiring VSSX) is disposed between the external input terminal 102 connected to the wiring VID11 and the external input terminal 102 connected to the wiring CLX. This makes it easy to dispose the shielding line 84 between the wirings VID1–VID12 and the wirings ENB1, ENB2, CLX', and CLX. In particular, the above-described arrangement makes it possible to prevent the image signals VID1–VID12 from receiving clock noise from the clock signal CLX or other signals before the image signals are input from an external circuit such as a display information processing circuit to the liquid crystal apparatus 200. Thus, in the present embodiment, intrusion of high-frequency clock noise from the clock signal wiring to the image signal wiring is suppressed before and after the image signal is input to the liquid crystal apparatus 200. More preferably, the external input terminals 102 for the wirings VID1–VID12 are disposed at locations as close to both side ends as possible (in an X direction and in an opposite direction) in areas available for formation of the external input terminals 102 in the peripheral on the TFT array substrate 1. Furthermore, it is preferable that the external input terminal 102 disposed at a central location for the interconnection line CLX' be spaced as far apart as possible from the external input terminals 102 for the wirings VID1–VID12, and it is preferable that the external input terminals 102 for the shielding lines 84, 85, 86, 87 and the like be disposed in the spaces.

In the present embodiment, the wirings VSSX, VSSY, VDDX, and VSSY are extended such that they also serve as shielding lines 84, 85, 86, and 87 thereby making it possible to share external input terminals and wirings for different purposes, and thus achieving simplification of the structure of the apparatus and a reduction in space. By sharing the same lines for both the shielding lines 84, 85, 86, 87 and the constant electric potential lines, it becomes possible to easily maintain the shielding lines 84, 85, 86, and 87 at constant electric potentials. However, the power supply wirings and shielding lines may be formed separately.

In the present embodiment, as described in FIG. 5, two external input terminals 102 are provided for inputting the negative power supply VSSX. The wirings VID1–VID12 extending on the TFT array substrate 1 are surrounded by the shielding line 84 maintained at the electric potential (negative electric potential) of the negative power supply VSSX. The shielding line 84 made of a metal layer such as Al, which is the same metal layer as that used to form the data lines 35, extends between the shift register 101a and the waveform control circuit 101b. The end of this shielding line 84 is connected, as will be described in further detail later, to the shielding line 84 via a shielding line conjunction part 81, which is made of the same electrically conductive layer as that used to form, for example, the scanning lines 31, such as a polysilicon layer, under the metal layer such as Al via a first interlayer insulating layer, such that the waveform control circuit 101b and the buffer circuit 101c are surrounded by the shielding line 84 and the conjunction part 81.

On the other hand, in an area adjacent to the data line driving circuit 101, as shown in FIG. 5, on the TFT array substrate 1, the wirings CLX and CLX' are surrounded, by the shielding line 86 maintained at a electric potential (positive electric potential) of the positive power supply VDDX. The shielding line 86 made of the same metal layer as that used to form the data lines 35, such as Al, extends between the waveform control circuit 101b and the buffer circuit 101c. The end of this shielding line 86 is connected to the shielding line 86 via a shielding line conjunction part 83 which is made of the same electrically conductive layer as that used to form, for example, the scanning lines 31, such as a polysilicon layer, such that the waveform control circuit 101b and the shift register circuit 101a are surrounded by the shielding line 86 and the conjunction part 83.

Thus, on the TFT array substrate 1, the wirings VID1–VID12 are doubly shielded from the wirings CLX, CLX', ENB1, and ENB2, and the shift register circuit 101a, the waveform control circuit 101b, and the buffer circuit 101c are shielded in a highly reliable fashion. However, even when the above-described surrounding structure is not employed, if at least one of the shielding lines 84, 85, 86 and 87 is disposed between the wirings CLX, CLX', ENB1, ENB2 and the wirings VID1–VID12, then shielding effects may be achieved to a certain degree.

In the present embodiment, as shown in FIGS. 4 and 5, the image display area and the plurality of data lines 35 are surrounded by the shielding line 85 on the TFT array substrate 1. As a result, the image display area and the plurality of data lines 35 are also shielded from the wirings CLX, CLX', ENB1, and ENB2. Thus, high-frequency clock noise to the sampling circuit driving signal output from the data line driving circuit 101 and the data signals input to the TFTs 30 or the pixel electrodes 11 is also suppressed. However, even when the image display area is not surrounded by such wirings, if the wirings VID1–VID12 are shielded by the shielding line 84, 85, 86, or 87 over the range to the sampling circuit 301, then the shielding effects are obtained to a certain degree. Herein, as can be seen from FIG. 4, the shielding line 85 extends from the wiring VSSY such that the power supply signal VSSY is supplied in a redundant fashion to the scanning line driving circuits 104 provided at both sides of the image display area so that even if breakage or disconnection occurs in the shielding line 85 or wiring VSSY, the disconnection does not result in a fatal failure of the apparatus.

As shown in the cross-sectional views of FIGS. 7(*a*) and 7(*b*), the various wirings DY, VSSY, . . . , VDDX connected to the corresponding external input terminals 102 are made of the same low-resistance metal material as that used to form the data lines 35, such as Al (aluminum). Therefore, the shielding lines 84 (wiring VSSX), 85 (wiring VSSY), 86 (wiring VDDX), and 87 (wiring VDDY) may extend along long distances while maintaining the resistance of these shielding lines 84, 85, 86, and 87 to a level low enough for practical use. That is, as shown in FIG. 5, the shielding lines 84 and 86 may extend in a zigzag fashion over a long distance passing through space among other various wirings, the shift register circuit 101*a,* the waveform control circuit 101*b,* and the buffer circuit 101*c.* The shielding line 85 may extend over a long distance around a large area including the image display area. Thus, it is possible to achieve effective shielding using a rather simple structure. As shown in FIGS. 7(*a*) and 7(*b*), the various wirings DY, VSSY, . . . , VDDX are formed on a first interlayer insulating layer 42 on the TFT array substrate 1. That is, they are formed on the same layer. This allows achievement of further effective shielding effects. This structure allows the various wirings DY, VSSY, . . . , VDDX to be formed at the same time using the same low-resistance metal layer, such as an Al layer, in the same process during the production process of the liquid crystal apparatus 200.

FIG. 8(*a*) is an enlarged view of wirings VID1–VID12 extending between the data line driving circuit 101 and the sampling circuit 301 shown in FIGS. 4 and 5. In FIG. 8(*a*), wirings VID1, . . . , VID11 as the odd-numbered image signal lines and wirings VID2, . . . , VID12 as the even-numbered image signal lines alternately extend in a comb form every wiring from both sides. That is, the wirings VID1–VID12 and the sampling circuit driving signal lines 306 are disposed in an area adjacent to the data line driving circuit 101 in a very systematic and well-balanced fashion.

In the present embodiment, in order to prevent the liquid crystal from being degraded by a DC driving signal and also prevent the displayed image from having a flicker, any proper technique of inverting the voltage applied to the liquid crystal may be employed. Such techniques includes field-by-field or frame-by-frame inversion driving, inversion driving of every scanning line (1H inversion), inversion driving of every data line (1S inversion), and dot-by-dot inversion driving. When the voltage polarity is inverted for driving a liquid crystal such that adjacent data lines have opposite polarities, as is the case in the 1S inversion and the dot-by-dot inversion, it is more preferable, instead of extending wirings VID1–VID12 alternately every line from opposite sides into a comb form as shown in FIG. 8(*a*), to extend wirings alternately every two lines from opposite sides between the data line driving circuit 101 and the sampling circuit 301 such that two wirings VID1 and VID2 corresponding to two adjacent data lines 35 are extended from one side (for example from right side) then two wirings VID3 and VID4 corresponding to another two adjacent data lines 35 are extended from the other side (from left side), after that, two wirings VID5 and VID6 from right, VID7 and VID8 from left, and so on, as shown in FIG. 8(*b*). With this arrangement, the image signals supplied to data lines 35 become opposite in polarity between two wirings disposed adjacent each other on the TFT array substrate 1, that is between wirings 1 and 2, between 3 and 4, and so on. Thus, noise components in the signals arising from the same noise source are canceled out between two adjacent image signal lines, and thus noise is suppressed.

(Operation of Liquid Crystal Apparatus)

Referring to FIG. 1, the operation of the liquid crystal apparatus 200 with the above construction is described below.

A scanning line driving circuit 104 applies a scanning signal to the scanning lines 31, line by line, in the form of a pulse at a predetermined timing. In parallel with this, if the sampling circuit 301 receives parallel image signals via twelve wirings VID1–VID12, the sampling circuit 301 samples these image signals. In synchronization with the timing of applying the gate voltage from the scanning line driving circuit 104, the data line driving circuit 101 supplies a sampling circuit driving signal to the data lines, line by line, corresponding to the twelve wirings VID1–VID12, respectively, thereby turning on the TFTs 302 of the sampling circuit 301. Thus, the data signal is sampled by the sampling circuit 301, and the resultant data signal is applied to the adjacent twelve data lines 35 line by line. As described above, the image signals VID1–VID12 serial-to-parallel converted into twelve phases input from the wirings VID1–VID12 are supplied to the data lines 35 via the data line driving circuit 101 and the sampling circuit 301.

As described above, a voltage is applied to a pixel electrode 11 via a corresponding TFT 30 to which both scanning signals and data signals are applied. The voltage of the pixel. electrode 11 is held by a storage capacitor (which will be described later) for a period of time which is 3 orders of magnitude longer than the period of time during which the source voltage is applied. The wirings VID1–VID12 are electrically shielded by the shielding lines 84, 85, 86, and 87 from the wirings CLX and CLX' and also from the wirings ENB1 and ENB2. Thus, even when the clock signal CLX has a high frequency, intrusion of high-frequency clock noise from the wirings CLX, CLX', ENB1, and ENB2 to the wirings VID1–VID12 is suppressed.

When the voltage is applied to the pixel electrode 11 in the above-described manner, the alignment of the liquid crystal located between this pixel electrode 11 and a common electrode (which will be described later) in a liquid crystal layer 50 varies. In a normally white mode, an incident light is blocked by the liquid crystal to a degree determined by the applied voltage. On other hand, in a normally black mode, the incident light is allowed to pass through the liquid crystal to a degree determined by the applied voltage. The liquid crystal apparatus 200 as a whole emits light which forms an image with a contrast corresponding to the image signal.

As a result, a high-quality image with a high resolution is displayed in accordance with the serial high-frequency image signals VID1–VID12 under the control of the high-frequency clock signal CLX without having any or significant degradation in the image quality caused by high-frequency clock noise. Furthermore, the frequency of the image signal is reduced by converting the original image signal into as large a number of phases as twelve by means of serial-to-parallel conversion, thereby making it possible to perform the sampling process using a sampling circuit of the widely-used type.

(General Structure of Liquid Crystal Apparatus)

Figure 9:
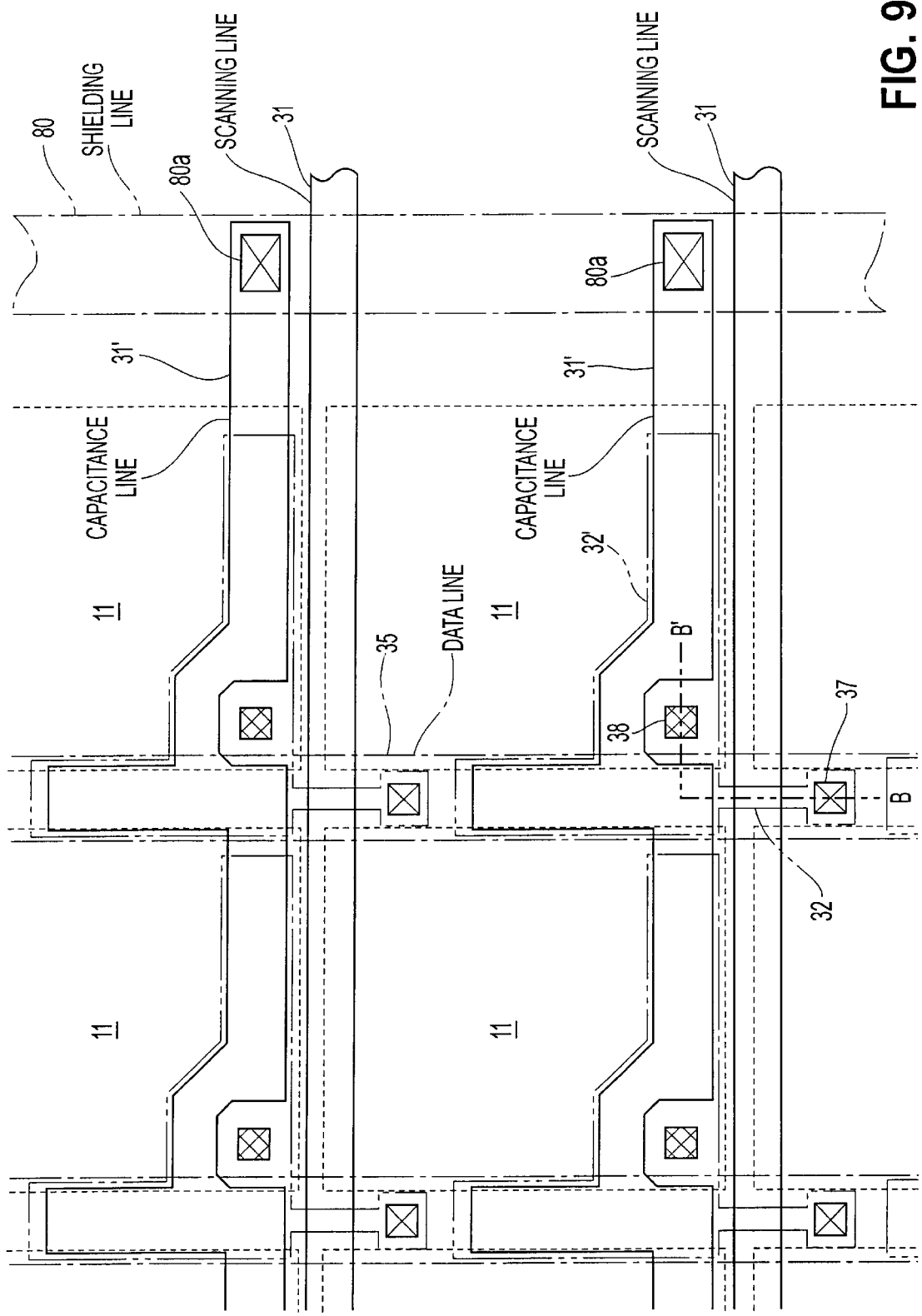
FIG. 9 is an enlarged plan view illustrating pixel electrodes, scanning lines, data lines and the like formed in an end portion of an image display area on the TFT array substrate according to the present invention.
Figure 10:
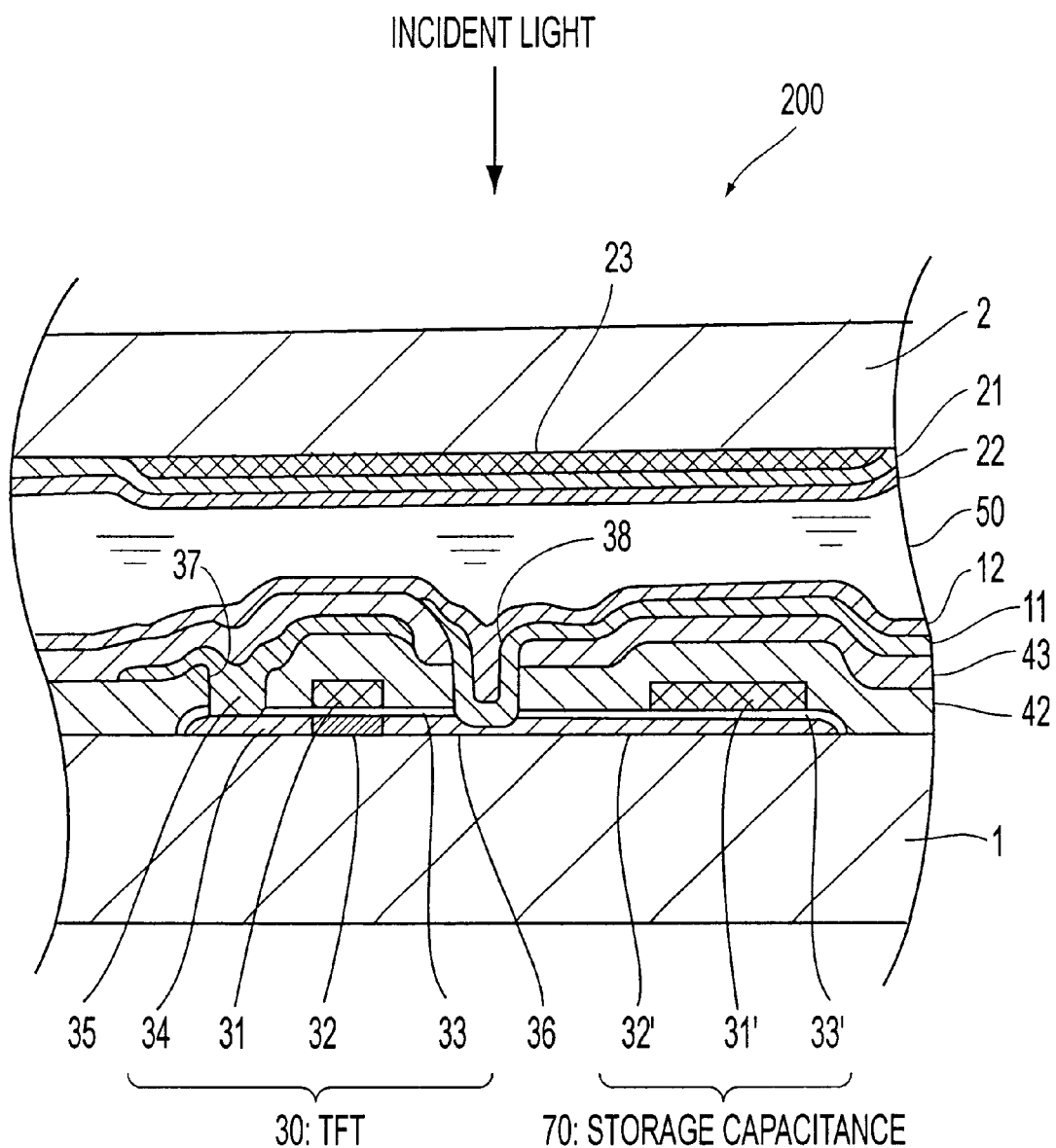
FIG. 10 is a cross-sectional view taken along line B—B' of FIG. 9 illustrating a TFT formed in the image display area of a liquid crystal apparatus according to the present invention.
Figure 11:
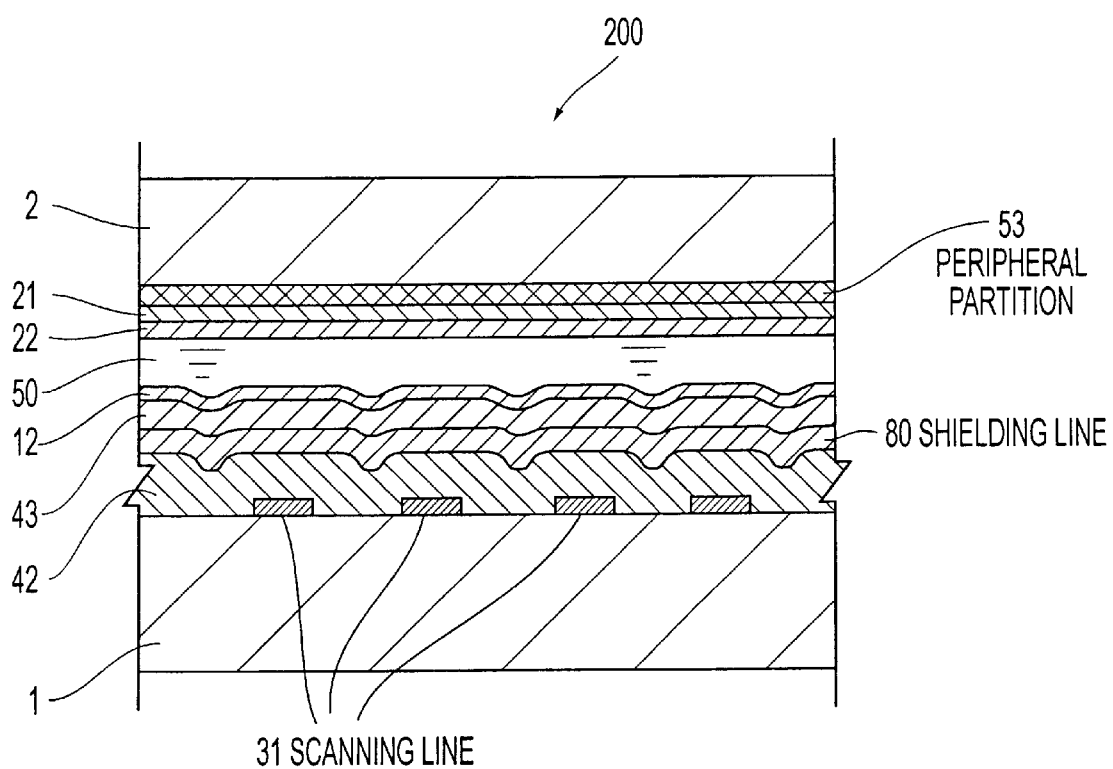
FIG. 11 is a cross-sectional view illustrating a shielding wiring line formed in a light shielding frame area of the liquid crystal apparatus according to the present invention.

A specific example of the construction of the liquid crystal apparatus 200 according to the first or second embodiment is described below with reference to FIGS. 9, 10, and 11. FIG. 9 is a plan view illustrating a pixel portion of the liquid crystal apparatus 200. FIG. 10 is a cross-sectional view taken along line B—B' of FIG. 9, and FIG. 11 is a cross-sectional view take along a shielding line 80 disposed opposite to a frame (light shielding fraine). In FIGS. 10 and 11, the respective layers and other elements are drawn such that they have a large enough size in the figure to provide a visible representation and thus they are not drawn to scale.

As shown in the plan view of FIG. 9, the capacitance line 31' is formed such that it extends on the TFT array substrate 1 in a direction parallel to the scanning line 31 (gate electrode), wherein the capacitance line 31' is made of the same electrically conductive layer as that used to form, for example, the scanning line 31, such as a polysilicon layer. The capacitance line 31' is connected to the shielding line 80 via a contact hole 80a. In this structure, the shielding line 80 can also be used as a wiring for maintaining the capacitance line 31' at a constant electric potential and the external input terminal 102 for the shielding line 80 can also be used as an external input terminal for inputting the constant electric potential at which the capacitance line 31' is maintained.

FIG. 10 is a cross-sectional view illustrating a part of the liquid crystal apparatus 200 where a TFT 30 for the respective pixels are formed. As shown, this part includes a TFT array substrate 1, a semiconductor layer 32 formed on the TFT array substrate 1, a gate insulating layer 33, a scanning line 31 (gate electrode), a first interlayer insulating layer 42, a data line 35 (source electrode), a second interlayer insulating layer 43, a pixel electrode 11, and an alignment film 12. The liquid crystal apparatus 200 further includes an opposite substrate 2 made up of for example a glass substrate, a common electrode 21 formed on the opposite substrate 2, an alignment film 22, and a light shielding film 23. Furthermore, the liquid crystal apparatus 200 includes a liquid crystal layer 50 disposed between the two substrates described above.

The first and second interlayer insulating films 42 and 43 are made of, for example, silicate glass such as NSG (non-doped silicate glass), PSG (phosphosilicate glass), BSG (boronsilicate glass), or BPSG (boron phosphosilicate glass), or a silicon oxide film or a silicon nitride film with a thickness of 500 to 1500 nm. An interlayer insulating layer serving as an underlayer of the TFT 30 may be formed on the TFT array substrate 1 using a silicate glass film, silicon nitride film, or silicon oxide film or the like.

The pixel electrodes 11 are made of a transparent electrically conductive thin film such as an ITO (indium tin oxide) film. The pixel electrodes 11 may be formed by depositing an ITO film or the like with a thickness of about 50 to 200 nm by means of, for example, sputtering and then performing a photolithography process and an etching process on the deposited film. When the liquid crystal apparatus 200 is used in the reflective type liquid crystal device, the pixel electrode 11 may be formed of an opaque material having a high reflectivity, such as Al.

The alignment film 12 is made of, for example, an organic thin film such as a polyimide thin film. The alignment film 12 may be formed by coating a polyimide-based. solution, and then rubbing it in a predetermined direction at a predetermined pre-tilt angle.

The common electrode 21 is formed over the entire surface of the opposite substrate 2. The common electrode 21 may be formed by depositing an ITO film or the like with a thickness of about 50 to 200 nm by means of, for example, sputtering and then performing a photolithography process and an etching process on the deposited film.

The alignment film 22 is made of, for example, an organic thin film such as a polyimide thin film. The alignment film 22 may be formed by coating a polyimide-based solution and then rubbing it in a predetermined direction at a predetermined pre-tilt angle.

The light shielding film 23 is formed in a predetermined area corresponding to the TFTs 30. The light shielding film 23 may be formed, as in the case of the light shielding frame 53, by means of sputtering a metal material such as Cr or Ni, and then performing a photolithography process and an etching process, or otherwise the light shielding film 23 may be formed using a resin black or the like consisting of a photoresist containing dispersed carbon or Ti. The light shielding film 23 serves not only to prevent the semiconductor layer (polysilicon film) 32 of TFTs 30 from being exposed to light, but also to improve the contrast and prevent the colors of coloring materials from mixing.

A liquid crystal layer 50 is formed by putting a liquid crystal into a space which is surrounded by a sealing material 52 (refer to FIG. 13) between the TFT array substrate 1 and the opposite substrate 2 which are disposed so that the pixel electrodes 11 and the common electrode 21 face each other. When no electric field is applied from the pixel electrode 11 to the liquid crystal layer 50, the liquid crystal layer 50 is aligned in a predetermined direction determined by the alignment films 12 and 22. The liquid crystal layer 50 is made of, for example, one type of nematic liquid crystal or a mixture of two or more types of nematic liquid crystals. The sealing material 52 is an adhesive, such as a photo-curing resin or a thermal curing resin, by which the two substrates 1 and 2 are adhered to each other along their peripheries. The sealing material 52 contains a spacer by which the two substrates are spaced from each other by a predetermined distance.

Now, the respective layers of the TFT 30 are described below.

The TFT 30 includes a scanning line 31 (gate electrode), a semiconductor layer 32 in which a channel is formed by an electric field from the scanning line 31, a gate insulating layer 33 isolating the semiconductor layer 32 from the scanning line 31, a source region 34 formed in the semiconductor layer 32, a data line 35 (source electrode), and a drain region 36 formed in the semiconductor layer 32. The drain region 36 is connected to the corresponding one of the plurality of pixel electrodes 11. The source region 34 and the drain region 36 are formed, as will be described in further detail later, by doping an n-type or p-type dopant into the semiconductor layer 32 to a proper concentration, wherein the type of the dopant is selected depending on whether an n-type or p-type channel is formed. The n-channel TFT has the advantage that it can operate at a high speed, and thus n-channel TFTs are usually employed as the TFTs 30 as the pixel switching element.

The semiconductor layer 32 of the TFT 30 may be formed by depositing an a-Si (amorphous silicon) film on the TFT array substrate 1, and then performing an annealing process, thereby forming a solid phase grown semiconductor layer with a thickness of about 50 to 200 nm. In the case where the TFT 30 is formed into the n-channel type, the semiconductor layer 32 may be formed by doping a V-group element such as Sb (antimony), As (arsenic), or P (phosphorus) by means of ion implantation or the like. On the other hand, in the case where the TFT 30 is formed into the p-channel type, the semiconductor layer 32 may be formed by doping a III-group element such as B (boron), Ga (gallium), or In (indium) by means of ion implantation or the like. In particular, when the TFT 30 is formed into an n-channel type TFT with an LDD (lightly doped drain) structure, a p-type type semiconductor layer 32 is partially doped with a V-group element such as P serving as a dopant, such that lightly doped regions are formed in a source region 34 and also in a drain region 36 at locations adjacent to the channel region, and then heavily doped regions are formed by doping a V-group element such as P. When the TFT 30 is formed into the p-channel type, a III-group element such as B is doped into an n-type semiconductor layer 32 so as to form a source region 34 and a drain region 36. When the TFT is formed into the LDD structure, the resultant TFT has less short-channel effects. The TFT 30 may also be formed into a TFT with an offset structure by performing ion implantation into the lightly doped regions of the LDD structure. Alternatively, the TFT 30 may be formed into a self-aligned structure which may be obtained by implanting high-concentration impurity ions using the gate electrode as a mask thereby forming heavily doped source and drain regions in a self-aligned manner. The TFT 30 may be formed into a dual gate structure having two gate electrodes 31 disposed in series. Alternatively, three or more gate electrodes 31 may be formed in a series fashion. The dual gate structure or a similar structure has the advantage in that it has a less leakage current when the TFT 30 is in an off-state, and thus crosstalk is suppressed. Thus it is possible to realize a high-performance liquid crystal apparatus.

The gate insulating layer 33 may be obtained by thermally oxidizing the semiconductor layer 32 at a temperature of 900 to 1300° C., thereby forming a thermal oxide film with a rather thin thickness of 30 to 150 nm, so that an insulating film with a good interfacial state can be obtained between the semiconductor layer 32 and the gate insulating layer 33.

The scanning line (gate electrode) 31 may be formed by depositing a polysilicon film by means of a low-pressure CVD process or the like, and then performing a photolithography process and an etching process and the like on the deposited film. Alternatively, the scanning line 31 may be formed of a metal film such as Al or a metal silicide film. In this case, if the scanning line 31 (gate electrode) is disposed as a light shielding film corresponding to a part of or the whole of the area covered with the light shielding film 23, then the part of or the whole of the light shielding film 23 may be removed by the light-shielding property obtained by a metal film or a metal silicide film. Furthermore, in this case, it is possible to prevent a reduction in the pixel opening ratio due to a positioning error during the process of adhering the opposite substrate 2 to the TFT array substrate 1.

The data line 35 (source electrode) may also be formed, in the same manner as for the pixel electrode 11, using a transparent electrically conductive thin-film such as an ITO film. Alternatively, the data line 35 may be formed by depositing a film of a low-resistance metal such as Al or a metal silicide with a thickness of about 100 to 500 nm by means of sputtering or the like.

Furthermore, contact holes 37 and 38 are formed in the first interlayer insulating layer 42 such that the contact hole 37 reaches the source region 34 and the contact hole 38 reaches the drain region 36. The data line 35 (source electrode) is electrically connected to the source region 34 via the contact hole 37 provided for the source region 34. The contact hole 38 of the drain region 36 is also formed in the second interlayer insulating layer 43. The pixel electrode 11 is electrically connected to the drain region 36 via the contact hole 38 provided for the drain region 36. The pixel electrode 11 described above is formed on the upper surface of the second interlayer insulating layer 43 formed in the above-described manner. Small-sized contact holes can be formed using a dry etching process such as reactive etching, reactive ion beam etching, or the like. This makes it possible to realize a pixel with a high opening area ratio.

In general, when the semiconductor layer 32 in which the channel is formed is illuminated with light, a photocurrent is generated in the semiconductor layer due to the photoelectric conversion effect of the p-Si film. Such a photocurrent results in degradation in the transistor characteristics of the TFT 30. In the present embodiment, the above problem is prevented by forming the light shielding film 23 on the opposite substrate 2, at locations corresponding to the respective TFTs 30 so that the semiconductor layer 32 is prevented from being directly exposed to the incident light. Additionally or instead, the data line 35 may be formed of a thin film of opaque metal such as Al in such a manner that the gate electrode is covered with the data line 35 from upper side thereby ensuring that the semiconductor layer 32 is effectively shielded, in conjunction with the light shielding film 23 and/or by the data line itself, against the incident light toward the semiconductor layer 32 (that is, the light coming from the upper side in FIG. 7).

In FIG. 10, each pixel electrode 11 has a storage capacitor 70. More specifically, the storage capacitance 70 includes a first storage capacitor electrode layer 32' formed by the same process as the semiconductor layer 32, an insulating layer 33' formed by the same process as the gate insulating layer 33, a capacitance line (second storage capacitor electrode) 31' formed by the same process as the scanning line 31, first and second interlayer insulating layers 42 and 43, and a part of the pixel electrode 11 which faces the capacitance line 31' via the first and second interlayer insulating layers 42 and 43. The storage capacitor 70 makes it possible to display a high-precision image even when the duty ratio is small.

As shown in the cross-sectional view of FIG. 11, the shielding line 80 passes over the first interlayer insulating layer 42 such that the shielding line 80 extends in a direction parallel to the light shielding frame 53 and crosses over a plurality of scanning lines 31. Most part of the shielding line 80 is made up of a low-resistance wiring formed of a thin metal film such as an Al produced by the same process as the data line 35 described above. This structure has the advantage that the shielding line 80 and the data line 35 can be produced at the same time during the production process of the liquid crystal apparatus 200.

Furthermore, in the present embodiment, because polysilicon type TFTs are employed as the TFTs 30, peripheral circuits made up of polysilicon type TFTs 302, such as the sampling circuit 301, the data line driving circuit 101, and the scanning line driving circuit 104, are produced at the same time during the same thin film process for the TFTs 30. These peripheral circuits may be constructed into a complementary configuration with n-channel and p-channel type polysilicon TFTs, and may be disposed in a peripheral area on the TFT array substrate 1.

In the liquid crystal apparatus 200, although not shown in FIGS. 10 and 11, a polarizing film, a phase difference film, and/or a polarizer are properly disposed on the side of the opposite substrate 2 which is exposed to the projection light, and also on the side of the TFT array substrate 1 from which the projection light emerges, depending on the operation mode such as a TN (twisted nematic) mode, a STN (super TN) mode, a D-STN (double STN) mode, or normally white mode/normally black mode.

(General Structure of Liquid Crystal Apparatus According to the Present Invention)

The general structure of the liquid crystal apparatus according to the first and second embodiments are described below.

Figure 12:
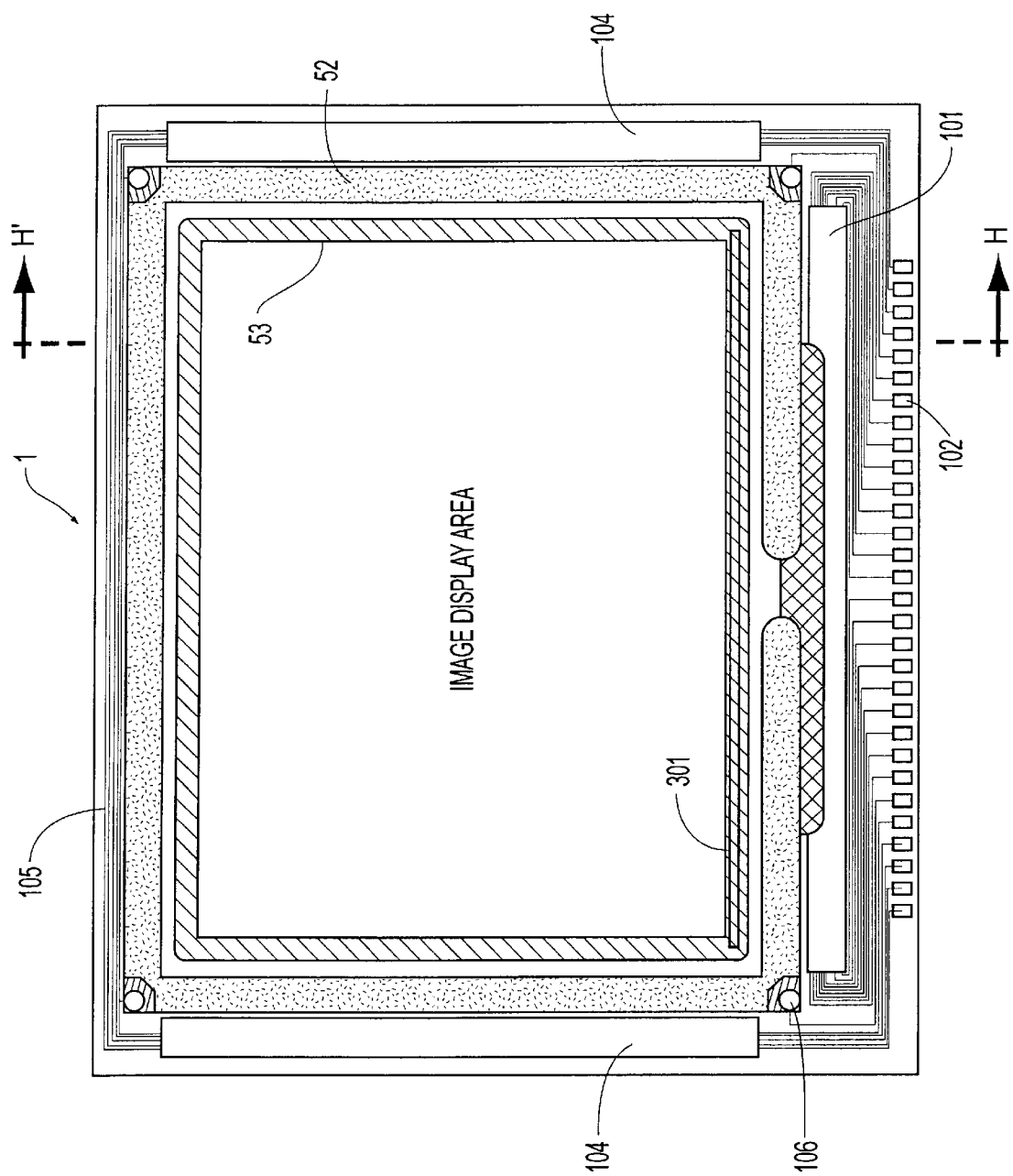
FIG. 12 is a plan view illustrating a general construction of the liquid crystal apparatus according to the present invention.
Figure 13:
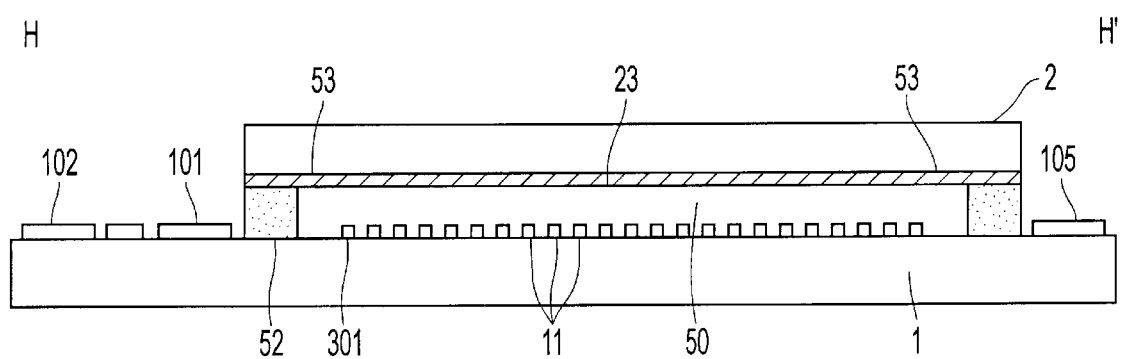
FIG. 13 is a cross-sectional view taken along line H—H' of FIG. 12.

FIG. 12 is a plan view illustrating the general structure of the liquid crystal apparatus according to the present invention. FIG. 13 is a cross-sectional view taken along line H—H' of FIG. 12. As shown in FIG. 12, the sampling circuit 301 is disposed on the TFT array substrate 1 in the area denoted by diagonal shading in FIGS. 1 and 4, wherein the location of this area corresponds to the location of the light shielding frame 53 disposed on the opposite substrate 2. The data line driving circuit 101 and the scanning line driving circuit 104 are formed in a narrow and long peripheral area of the TFT array substrate 1, wherein this area is not in contact with the liquid crystal layer 50. A sealing material 52 such as a photo-curing resin serving as a sealing member is disposed on the TFT array substrate 1 and around the image display area, such that the liquid crystal layer 50 is sealed within the space between the two substrates adhered to each other via the sealing material 52. The light shielding frame 53 is disposed on the opposite substrate 2, at a location between the sealing material 52 and the image display area.

The light shielding frame 53 is made of an opaque material into the form of a frame with a width of 500 µm or wider around the image display area in such a manner that the image display area is not placed hidden under the edge of the opening of the case by production errors or the like, namely, allowing displacement of a few hundred µm for the case of the TFT array substrate 1 when the TFT array substrate 1 is placed into an opaque case with an opening in accordance with the image display area. The light shielding frame 53 may be formed by depositing a metal material such as Cr (chromium), Ni (nickel), or Al (aluminum) on the opposite substrate 2 using sputtering, photolithography, etching processes and the like. Alternatively, the light shielding frame 53 may be made of a photoresist containing dispersed carbon or Ti (titanium), called a resin black. Instead of forming the light shielding frame 53 on the opposite substrate 2, it may be formed on the TFT array substrate 1. In the case where the light shielding frame 53 is formed on the TFT array substrate 1, the pixel opening area is not influenced by the positioning accuracy of the process of adhering the TFT array substrate 1 and the opposite substrate 2 to each other, and thus the liquid crystal apparatus can have high-accuracy transmittance.

Outside the sealing material 52 and along the lower side of the image display area, the data line driving circuit 101 and external input terminals (mounting terminals) 102 are disposed. The scanning line driving circuits 104 are disposed at the two sides of the image display area and along the right and left sides of the image display area. The opposite substrate 2 having an outer shape and size similar to those of the sealing material 52 is fixed to the TFT array substrate 1 via the sealing material 52.

Because the shielding line 80 and the sampling circuit 301 are disposed on the TFT array substrate 1 and under the light shielding frame 53 in the above-described manner, the required space on the TFT array substrate 1 is reduced. More specifically, it is possible to find a sufficient area on the periphery of the TFT array substrate 1 for forming the scanning line driving circuit 104 and the data line driving circuit 101 without having any or a significantly large reduction in the effective image display area of the liquid crystal apparatus 200 caused by formation of the shielding line 80.

When the above-described liquid crystal apparatus 200 is used in a color liquid crystal projector, three similar liquid crystal apparatuses are used as RGB light valves, respectively, wherein respective lights with different colors created by passing through RGB color separation dichroic mirrors pass through as incident lights. Therefore, in the embodiment of the invention, no color filter is disposed on the opposite substrate 2. However, in the liquid crystal apparatus 200, an RGB color filter with a protective film may also be formed on the opposite substrate 2 in proper areas corresponding to the pixel electrodes 11 where the light shielding layer 23 is not formed. Alternatively, an RGB color filter layer of color resist may be formed at locations corresponding to the respective pixels on the TFT array substrate 1. This allows the liquid crystal apparatus according to the present embodiment to be employed in a color liquid crystal apparatus of a type other than the liquid crystal projector, such as a direct-view-type or reflection-type color liquid crystal television set. Furthermore, micro lenses may be formed on the opposite substrate 2 at locations corresponding to the respective pixels, so that the incident light is focused in a more efficient fashion, thereby achieving a brighter liquid crystal apparatus. Still furthermore, an interference film consisting of a large number of layers with different refractive index may be deposited on the opposite substrate 2, thereby forming a dichroic filter for producing an RGB color utilizing interference of light. By adding the dichroic filter to the opposite substrate, a still brighter color liquid crystal apparatus can be achieved.

In the liquid crystal apparatus 200, to suppress the alignment failure of the liquid crystal molecule on the TFT array substrate 1, a planarizing film may be further formed by means of a spin coating technique or the like on the second interlayer insulating layer 43 or a CMP (Chemical Mechanical Polishing) process may be performed on the second interlayer insulating layer 43. Alternatively, the second interlayer insulating layer 43 itself may be planarized.

In the above embodiments, the switching elements of the liquid crystal apparatus 200 are each formed into the structure of a normal stagger type or coplanar type polysilicon TFT. Alternatively, other types of TFTs such as a reverse stagger type TFT or an amorphous silicon TFT may also be employed.

Furthermore, although in the liquid crystal apparatus 200 described above, a nematic liquid crystal is employed as an example for the liquid crystal layer 50, a macromolecular dispersion type liquid crystal consisting of a macromolecular material containing dispersed liquid crystal particles may also be employed. In this case, the alignment films 12 and 22, the polarizing film, and the polarizer or the like become unnecessary. This allows an improvement in the efficiency of using light. As a result, it is possible to realize a high-brightness and low-power liquid crystal apparatus. In the case where the pixel electrodes 11 are made of a metal film having a high reflectivity, such as Al, and the resultant liquid crystal apparatus 200 is used in a reflective type liquid crystal apparatus, it is possible to employ an SH (super homeotropic) type liquid crystal in which liquid crystal molecules are substantially vertically aligned when no voltage is applied. Although in the liquid crystal apparatus 200 of the embodiments, a common electrode 21 is formed on the opposite substrate 2 so that a vertical electric field is applied to the liquid crystal layer 50, each pixel electrode 11 may be constructed with a pair of electrodes for generating a transverse electric field for applying a parallel electric field (transverse electric field) to the liquid crystal layer 50 (in this case, each pair of electrodes for generating a transverse electric field is formed on the TFT array substrate 1 and no electrode for generating a vertical electric field is formed on the opposite substrate 2). When the transverse electric field is employed, it is possible to achieve a wider viewing angle than can be achieved with the vertical electric field. Other various types of liquid crystal materials (liquid crystal layers), operating modes, liquid crystal arrangements, and driving techniques may also be employed in the present embodiment.

In the embodiments described above, there may be further provided other known peripheral circuits such as a precharging circuit or a test circuit or the like under the light shielding frame 53 or on a periphery of the TFT array substrate 1. The precharging circuit supplies a precharging signal over the data lines 35 at a timing preceding when the data signal is supplied from the data line driving circuit 101 over the data lines 35, so as to improve the contrast ratio, stabilize the voltage level of the data lines 35, and improve the line-to-line uniformity in intensity of the image displayed on the screen. That is, the precharging circuit facilitates writing a high-quality data signal on the data lines 35. A specific example of a precharging circuit is disclosed for an example in Japanese Unexamined Patent Publication No. 7-295520. The test circuit provided under the light shielding frame 53 or in the peripheral area on the TFT array substrate is used to test the quality or detect a defect in the liquid crystal apparatus during the production process or before shipment.

In the embodiments described above, switching elements may be realized using two-terminal type non-linear elements such as a TFD (thin film diode) instead of TFTs 30. The switching elements may be formed on a silicon substrate instead of on the quartz substrate or hard glass substrate. In this case, either the data lines or the scanning lines are disposed on the opposite substrate so that they act as the opposite electrode. The other lines are disposed on the TFT array substrate and switching elements are disposed between these lines and the pixel electrodes, whereby the liquid crystal is driven. Also in this structure, it is possible to prevent intrusion of high-frequency clock noise into the image signals or into the data signals by shielding the image signal lines and data lines from the clock signal line. Although embodiments have been described above with the liquid crystal apparatus as an example, the invention may also be applied to other electro-optical apparatus, such as an electroluminescent display device and a plasma display device.

(Electronic Devices)

Examples of electronic devices including the electro-optical apparatus 200 are described below with reference to FIGS. 14–18.

Figure 14:
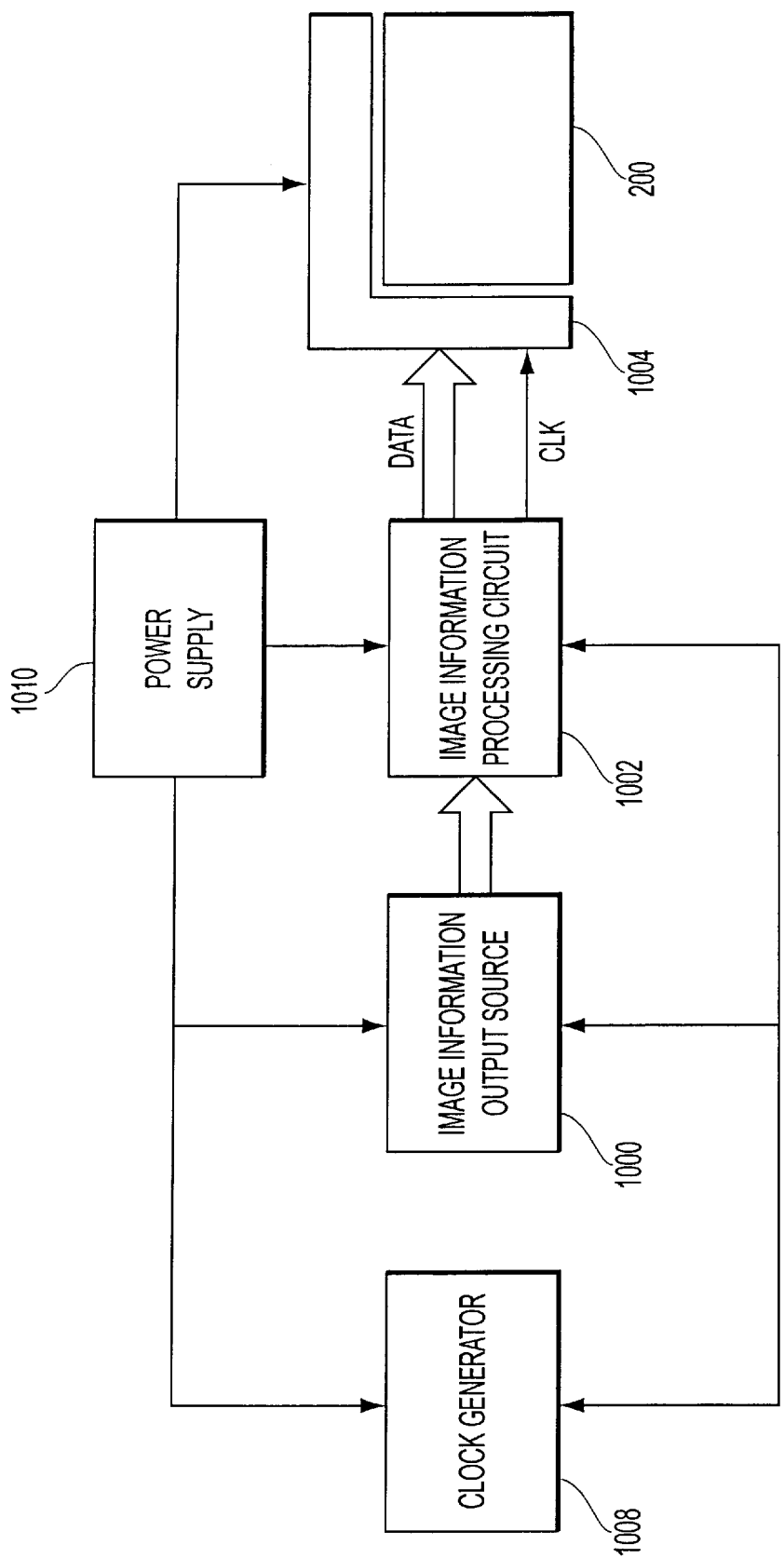
FIG. 14 is a block diagram illustrating a general structure of an electronic device according to an embodiment of the present invention.

FIG. 14 illustrates the general structure of an electronic device including the above-described liquid crystal apparatus 200.

As shown in FIG. 14, the electronic device includes a display information output source 1000, a display information processing circuit 1002, a driving circuit 1004, a liquid crystal apparatus 200, a clock generating circuit 1008, and a power supply circuit 1010. The display information output source 1000 includes a memory such as a ROM (read only memory), a RAM (random access memory), or an optical disk and a tuning circuit for tuning a TV signal or the like. In response to the clock signal supplied from the clock generating circuit 1008, the display information output source 1000 outputs display information such as an image signal of a predetermined format to the display information processing circuit 1002. The display information processing circuit 1002 includes various processing circuits such as an amplification polarity inverting circuit, a serial-parallel converting circuit, a rotation circuit, a gamma correction circuit, and a clamping circuit, which are all known in the art. The display information processing circuit 1002 successively generates a digital signal from the display information input in response to the clock signal, and outputs the resultant digital signal together with a clock signal CLK to the driving circuit 1004. The driving circuit 1004 drives the liquid crystal apparatus 200. The power supply circuit 1010 supplies predetermined electric power to the various circuits described above. The driving circuit 1004 may be mounted on the TFT array substrate 1 of the liquid crystal apparatus 200. In addition, the display information. processing circuit 1002 may also be mounted on the TFT array substrate 1.

Specific examples of electronic devices are described below with reference to FIGS. 15–18.

Figure 15:
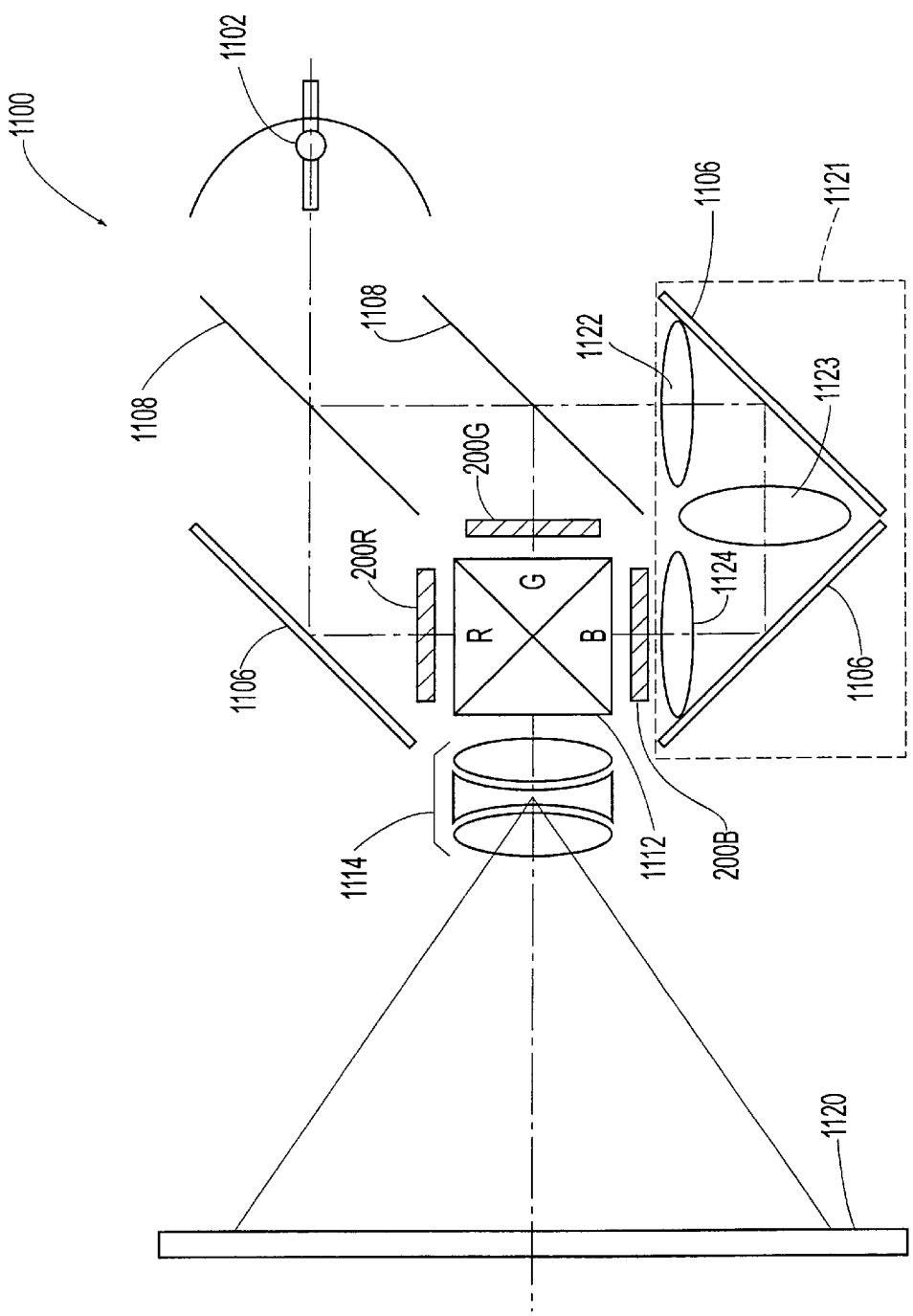
FIG. 15 is a cross-sectional view illustrating a liquid crystal projector which is an example of an electronic device.

In FIG. 15, a liquid crystal projector 1100, which is an example of an electronic device, includes three liquid crystal modules each including a liquid crystal apparatus 200 provided with a driving circuit 1004 of the above-described type formed on a TFT array substrate, wherein those three liquid crystal modules are used as light valves 200R, 200G, and 200B for R, G, and B colors, respectively. In this liquid crystal projector 1100, a projection light is emitted from a white light source such as a metal halide lamp serving as a lamp unit 1102. The light is divided by three mirrors 1106 and two dichroic mirrors 1108 into three light components R, G, B with three primary colors RGB. The three light components are then passed through the light valves 200R, 200G, and 200B, respectively. In the above process, in order to prevent the blue light B from having a transmission loss caused by a long optical path, the blue light B is transmitted via the relay lens system 1121 including an incident lens 1122, a relay lens 1123, and an outgoing lens 1124. The light components with three primary colors are separately modulated by the three light valves 200R, 200G, and 200B, respectively, and mixed into a single light through a dichroic prism 1112. The resultant light is projected onto a screen 1120 via the projection lens 1114, and thus a color image is formed thereon.

In the present embodiment, if another light shielding layer is provided also under the TFTs, this light shielding layer well prevents the channel of the TFTs serving as switching elements of the pixel electrodes from being exposed directly to various types of reflected lights, such as a reflected light which occurs when a light from the liquid crystal apparatus 200 is incident on a projection optical system in the liquid crystal projector, a light reflected from the surface of the TFT array substrate which occurs when the incident light passes through the liquid crystal apparatus 200, and a reflected light produced when the light outgoing from the liquid crystal apparatus partially passes through the dichroic prism 1112 (part of R and G components) or the like, even if these reflected lights enter from the TFT array substrate side as returning lights. In this case, a small-sized prism may be employed in the projection optical system without having to provide an AR film for preventing returning light at the boundary between the TFT array substrate of each liquid crystal apparatus and the prism, or without having to perform an AR coating process on the polarizer. Therefore, it is possible to achieve simplification in structure and reduction in size.

Figure 16:
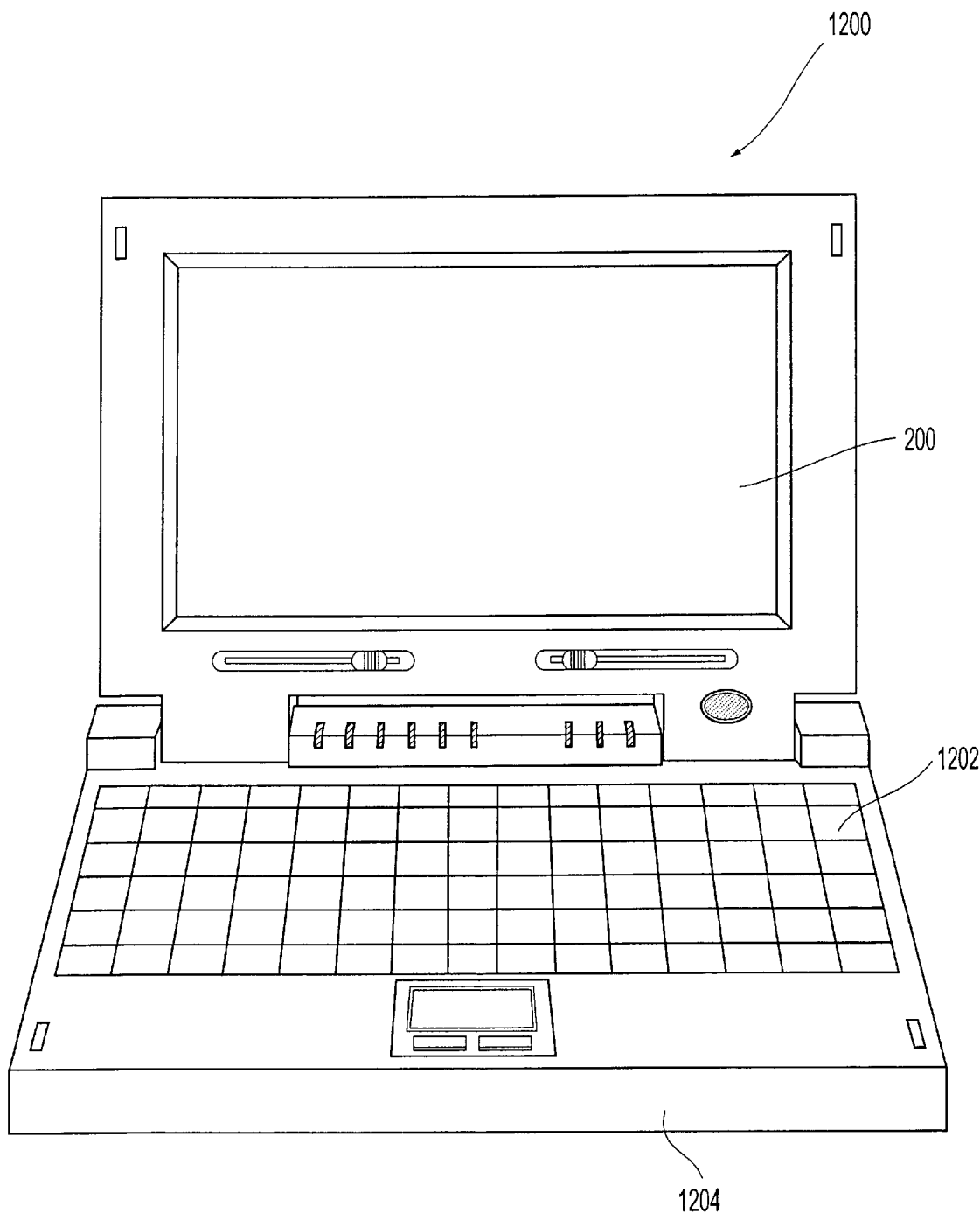
FIG. 16 is a front view illustrating a personal computer which is another example of an electronic device.

FIG. 16 illustrates another example of an electronic device, that is, a laptop personal computer(PC) 1200 including a liquid crystal apparatus 200 of the type described above disposed on the inner side of a top cover case. The main body 1204 of the laptop personal computer 1200 includes a CPU, a memory, a modem, a keyboard 1202, and the like.

Figure 17:
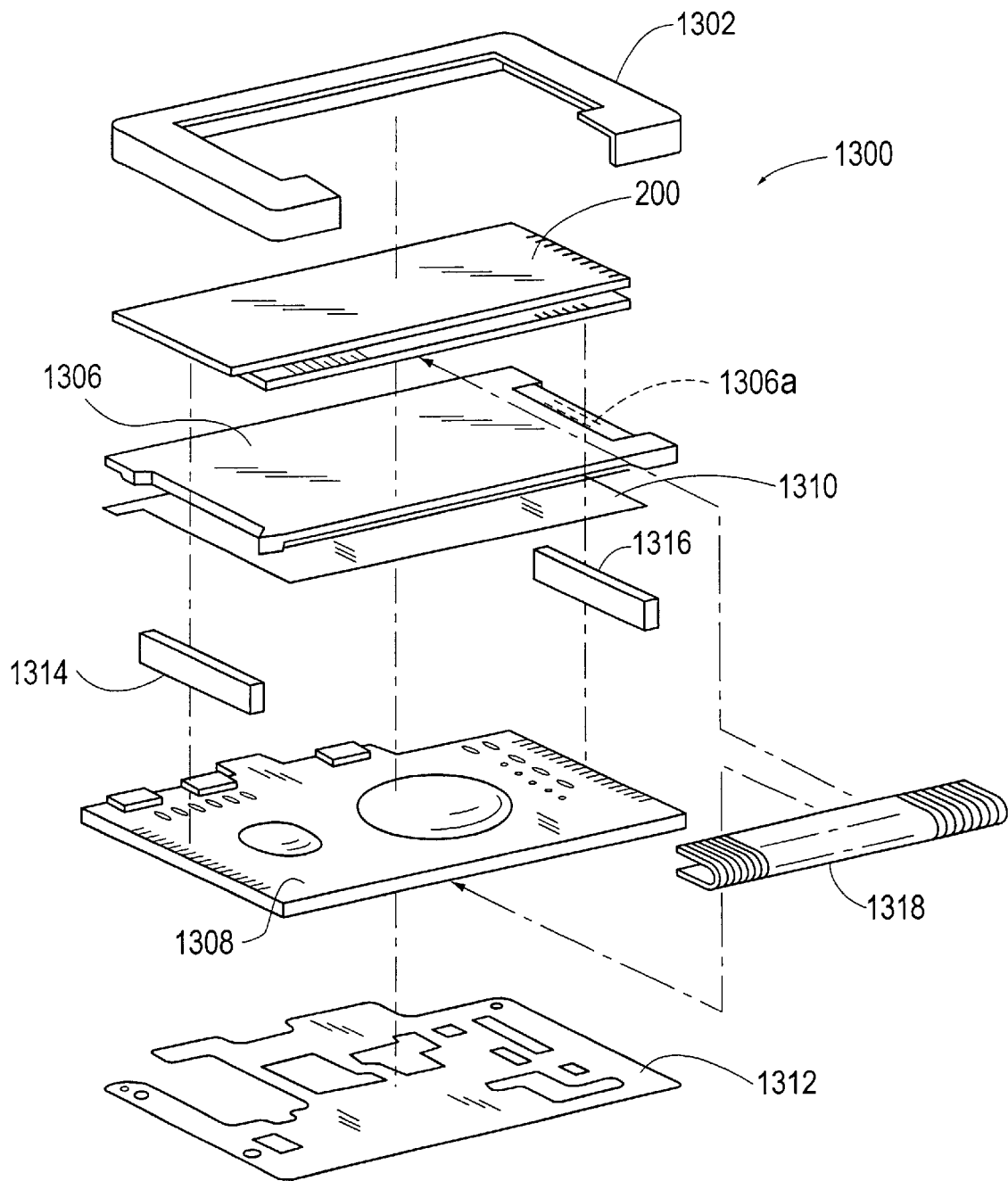
FIG. 17 is an exploded perspective view of a pager which is still another example of an electronic device.

FIG. 17 illustrates a pager 1300 which is another example of an electronic device. The pager 1300 consists of a metal frame 1302 and other elements located inside the metal frame 1302, including a liquid crystal apparatus 200 serving as a liquid crystal module provided with a driving circuit 1004 of the above-described type disposed on a TFT array substrate, a light guide 1306 with a back light 1306a, a circuit substrate 1308, first and second shielding plates 1310 and 1312, two elastic conductors 1314 and 1316, and a film carrier tape 1318. In this case, the display information processing circuit 1002 (refer to FIG. 11) described above may be disposed on either the circuit substrate 1308 or the TFT array substrate of the liquid crystal apparatus 200. Furthermore, the driving circuit 1004 described above may be disposed on the circuit substrate 1308.

In the specific example shown in FIG. 17, the pager includes the circuit substrate 1308. However, in the case where the liquid crystal apparatus 200 is formed into a liquid crystal module including a driving circuit 1004 and a display information processing circuit 1002, the liquid crystal apparatus 200 may be firmly placed in the metal frame 1302. In addition, the light guide 1306 may be further provided so as to achieve a back-light type liquid crystal apparatus. That is, the liquid crystal apparatus may be produced, sold, and used in various fashion.

Figure 18:
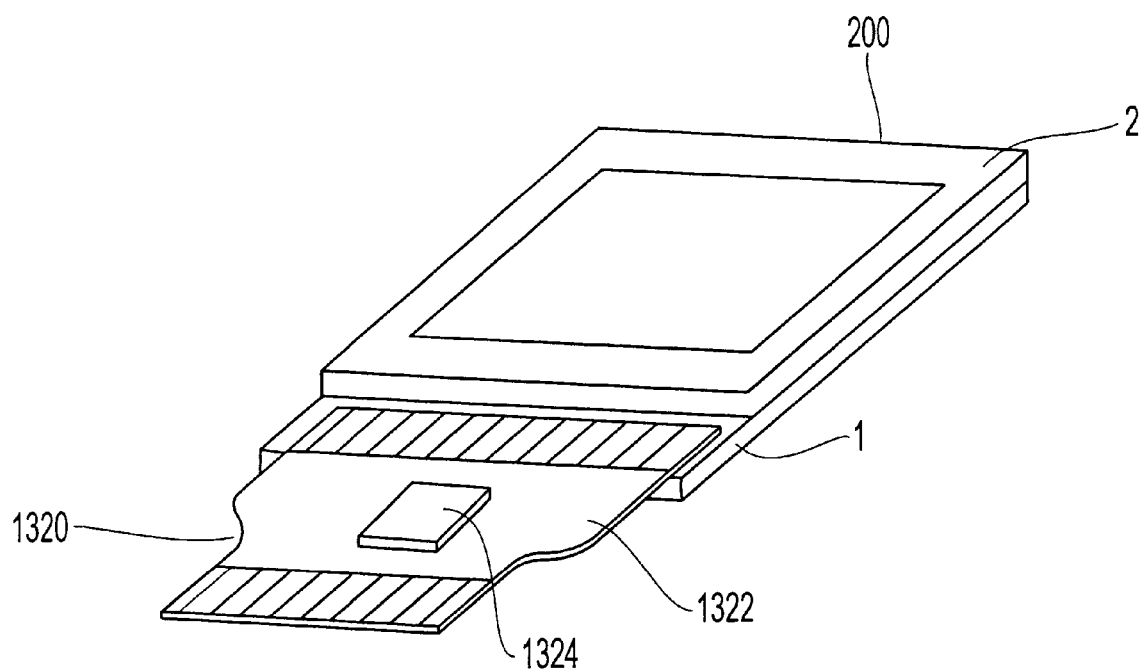
FIG. 18 is a perspective view of a liquid crystal apparatus using a TCP (Tape Carrier Package), which is another example of an electronic device.

In the case where the driving circuit 1004 and the display information processing circuit 1002 are not mounted on the liquid crystal apparatus 200, an IC 1324 including the driving circuit 1004 and the display information processing circuit 1002 may be connected electrically and physically to the TCP (Tape Carrier Package) 1320 mounted on the polymide tape 1322 via an anisotropic conductive film provided on the peripheral portion of the TFT array substrate 1, as shown in FIG. 18. The resultant assembly may be produced, used or sold as a liquid crystal apparatus.

In addition to the electronic devices described above with reference to FIGS. 15–18, there are other examples of the electronic device shown in FIG. 14. They include a liquid crystal television set, a view-finder type or monitor direct view type video tape recorder, a car navigation system, a pocket-sized electronic notebook, an electronic calculator, a word processor, an engineering workstation (EWS), a portable telephone, a video telephone, a POS terminal, and an apparatus with a touch panel.

In the embodiments of the present invention, as described above, high-frequency clock noise is suppressed and a high-quality image can be displayed. Furthermore, it is possible to realize various electronic devices including a liquid crystal apparatus 200 with a large-sized image display area using a substrate with a limited size.

Industrial Applicability

In the electro-optical apparatus according to the present invention, the image signal lines are shielded from the control signal lines such as a clock signal line by the electrically conductive line formed on the substrate and maintained at the constant electric potential so that intrusion of high-frequency clock noise from the clock signal line into the image signal lines is suppressed, thereby making it possible to display a high-quality image with a high resolution in accordance with the high-frequency image signal. Furthermore, the image signal lines are formed such that they extend at both sides of the data signal supply means. This allows a great number of image signal lines corresponding to a great number of phases obtained by means of serial-to-parallel conversion to be disposed in a well-balanced fashion at both sides of the data signal supply means, and thus it is possible to realize a large screen using a substrate with a limited size. By also shielding the image display area and the plurality of data lines, it becomes possible to suppress intrusion of high-frequency clock noise into the data signal or the like on the data lines thereby achieving further improved image quality.

The present invention can provide various types of electronic devices such as a liquid crystal projector, personal computer, and pager, in which high-frequency clock noise is suppressed and a high-quality image can be displayed in a large image display area realized using a substrate with a limited size.

What is claimed is:

1. An electro-optical apparatus comprising a substrate and a plurality of elements formed on said substrate, said elements including:

a plurality of scanning lines;

a plurality of data lines intersecting said plurality of scanning lines;

a plurality of switching elements being disposed in correspondence with intersections of said plurality of scanning lines and said data lines;

a plurality of pixel electrodes being disposed in correspondence with said plurality of switching elements;

a first external input terminal;

a second external input terminal;

an image signal line that supplies an image signal from the first external input terminal to said data lines;

a clock signal line that supplies a clock signal from the second external input terminal for controlling supply of said image signal to said data lines; and an electrically conductive line maintained at a constant electric potential that shields said image signal line from said clock signal line.

2. An electro-optical apparatus comprising a substrate and a plurality of elements formed on said substrate, said elements including:

a plurality of scanning lines;

a plurality of data lines intersecting said plurality of scanning lines;

a plurality of switching elements being disposed in correspondence with said plurality of scanning lines and said data lines;

a plurality of pixel electrodes connected to said plurality of switching elements;

a first external input terminal;

an image signal line connected to said a first external input terminal;

a sampling circuit electrically connected to at least one of said data lines and said an image signal line;

a second external input terminal;

a clock signal line connected to said second external input terminal;

a data line driving circuit electrically connected to said sampling circuit and said clock signal line which controls said sampling circuit in response to a clock signal and supplies an image signal from said image signal line to said data line; and an electrically conductive line maintained at a constant electric potential that shields said image signal line from said clock signal line.

3. An electro-optical apparatus comprising a substrate and a plurality of elements formed on said substrate, said elements including:
- a plurality of scanning lines;
- a plurality of data lines intersecting said plurality of scanning lines;
- a plurality of switching elements being disposed in correspondence with intersections of said plurality of scanning lines and said data lines;
- a plurality of pixel electrodes being disposed in correspondence with said plurality of switching elements;
- a first external input terminal;
- an image signal line electrically connected to said a first external input terminal and said data line;
- a second external input terminal;
- a clock signal line electrically connected to said second external input terminal;
- a data line driving circuit electrically connected to said clock signal line which controls supply of said image signal to said data lines;
- an electrically conductive line maintained at a constant electric potential that shields said image signal line from said clock signal line.

4. The electro-optical apparatus according to claim 3, said image signal line extending in a direction and said clock signal line extending in a different direction with respect to said image signal line.

5. An electro-optical apparatus according to claim 3, said electrically conductive line comprising a constant electric potential line that supplies a constant electric potential power-supply to said data signal supply means.

6. An electro-optical apparatus according to claim 5,
- said constant electric potential line including a first constant electric potential line and a second constant electric potential line that supply a different constant electric potential power-supply to said data signal supply means;
- said first constant electric potential line surrounding said image signal line on said substrate; and
- said second constant electric potential line surrounding said clock signal line on said substrate.

7. An electro-optical apparatus according to claim 5, said first external input terminal and said second external input terminal being disposed in a peripheral area of said substrate spaced from each other by a predetermined distance, the electro-optical apparatus further comprising a third external input terminal that inputs said constant electric potential power-supply to said constant electric potential line disposed between said first external input terminal and said second external input terminal.

8. An electro-optical apparatus according to claim 3, said electrically conductive line being extended such that said electrically conductive line surrounds, on said substrate, an image display area defined by said plurality of pixel electrodes and also surrounds said plurality of data lines.

9. An electro-optical apparatus according to claim 8, the substrate being a first substrate, the electro-optical apparatus further comprising:
- a second substrate located opposite of said first substrate; and
- a light shielding frame disposed along a contour of said image display area on at least either said first substrate or said second substrate, said electrically conductive line including a part formed on said first substrate at a location opposite to said light shielding frame and along said light shielding frame.

10. An electro-optical apparatus according to claim 3, said electrically conductive line and said data line being formed of a same metal material with a low resistance.

11. An electro-optical apparatus according to claim 3, a part of the electrically conductive line formed between said image signal line and said clock signal line, said image signal line, and said clock signal line being formed of a same low-resistance metal layer formed in a single same plane parallel to said substrate.

12. An electro-optical apparatus according to claim 3, further comprising a capacitance line connected to said electrically conductive line that provides a predetermined magnitude of capacitance to said pixel electrode.

13. An electronic device including the electro-optical apparatus according to claim 3.

* * * * *

UNITED STATES PATENT AND TRADEMARK OFFICE
CERTIFICATE OF CORRECTION

PATENT NO.    : 6,483,493 B2
DATED         : November 19, 2002
INVENTOR(S)   : Masao Murade It is certified that error appears in the above-identified patent and that said Letters Patent is hereby corrected as shown below:

<u>Title page,</u>
Item [30], Foreign Application Priority Data, change "P9-201253" to --P9-301253 --.

Signed and Sealed this

Twenty-fifth Day of March, 2003

JAMES E. ROGAN
*Director of the United States Patent and Trademark Office*